(12) United States Patent
Schoolcraft et al.

(10) Patent No.: US 10,598,261 B2
(45) Date of Patent: Mar. 24, 2020

(54) MULTI-SPEED PLANETARY TRANSMISSION

(71) Applicant: Allison Transmission, Inc., Indianapolis, IN (US)

(72) Inventors: Brian Schoolcraft, Crawfordsville, IN (US); James Raszkowski, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 16/406,611

(22) Filed: May 8, 2019

(65) Prior Publication Data

US 2019/0264783 A1    Aug. 29, 2019

Related U.S. Application Data

(62) Division of application No. 15/278,694, filed on Sep. 28, 2016, now Pat. No. 10,323,722.

(51) Int. Cl.
*F16H 3/66* (2006.01)
*F16H 3/44* (2006.01)

(52) U.S. Cl.
CPC ......... *F16H 3/66* (2013.01); *F16H 2003/445* (2013.01); *F16H 2200/0065* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 3,381,546 A | 5/1968 | Holl | |
| 3,503,282 A | 3/1970 | Peterson | |
| 4,089,239 A | 5/1978 | Murakami et al. | |
| 4,201,098 A | 5/1980 | Harvey | |
| 4,683,776 A | 8/1987 | Klemen | |
| 5,941,791 A | 8/1999 | Park | |

(Continued)

FOREIGN PATENT DOCUMENTS

| | | |
|---|---|---|
| CN | 103267093 A | 8/2013 |
| CN | 104033550 A | 9/2014 |

(Continued)

OTHER PUBLICATIONS

European search report and European search opinion dated Mar. 23, 2018 for EP Application No. 17191904.

(Continued)

*Primary Examiner* — Justin Holmes
(74) *Attorney, Agent, or Firm* — Faegre Drinker Biddle & Reath LLP

(57) ABSTRACT

A multi-speed transmission including a plurality of planetary gearsets and a plurality of selective couplers to achieve at least nine forward speed ratios is disclosed. The plurality of planetary gearsets may include a first planetary gearset, a second planetary gearset, a third planetary gearset, and a fourth planetary gearset. The plurality of selective couplers may include a number of clutches and a number of brakes. The multi-speed transmission may have four planetary gearsets and six selective couplers. The six selective couplers may include four clutches and two brakes.

19 Claims, 6 Drawing Sheets

(56) References Cited

U.S. PATENT DOCUMENTS

| | | |
|---|---|---|
| 6,176,803 B1 | 1/2001 | Meyer et al. |
| 6,723,018 B2 | 4/2004 | Hayabuchi et al. |
| 6,767,304 B1 | 7/2004 | Botosan et al. |
| 6,910,985 B2 | 6/2005 | Ishimaru et al. |
| 6,955,627 B2 | 10/2005 | Thomas et al. |
| 6,960,149 B2 | 11/2005 | Ziemer |
| 6,984,187 B2 | 1/2006 | Biermann |
| 7,101,305 B2 | 9/2006 | Tabata et al. |
| 7,128,683 B2 | 10/2006 | Oguri et al. |
| 7,226,381 B2 | 6/2007 | Klemen |
| 7,288,044 B2 | 10/2007 | Gumpoltsberger |
| 7,429,230 B2 | 9/2008 | Ziemer |
| 7,549,942 B2 | 6/2009 | Gumpoltsberger |
| 7,556,582 B2 | 7/2009 | Gumpoltsberger |
| 7,566,283 B2 | 7/2009 | Gumpoltsberger |
| 7,575,532 B2 | 8/2009 | Raghavan et al. |
| 7,575,533 B2 | 8/2009 | Gumpoltsberger |
| 7,632,206 B2 | 12/2009 | Gumpoltsberger |
| 7,635,315 B2 | 12/2009 | Kamm et al. |
| 7,651,431 B2 | 1/2010 | Phillips et al. |
| 7,674,200 B2 | 3/2010 | Shim |
| 7,686,730 B2 | 3/2010 | Baldwin |
| 7,691,022 B2 | 4/2010 | Phillips et al. |
| 7,691,024 B2 | 4/2010 | Phillips et al. |
| 7,695,398 B2 | 4/2010 | Phillips et al. |
| 7,704,181 B2 | 4/2010 | Phillips et al. |
| 7,722,496 B2 | 5/2010 | Phillips et al. |
| 7,727,104 B2 | 6/2010 | Shim |
| 7,731,625 B2 | 6/2010 | Phillips et al. |
| 7,736,262 B2 | 6/2010 | Suh |
| 7,736,263 B2 | 6/2010 | Phillips et al. |
| 7,753,820 B2 | 7/2010 | Phillips et al. |
| 7,766,783 B2 | 8/2010 | Wittkopp et al. |
| 7,771,305 B1 | 8/2010 | Hart et al. |
| 7,771,306 B2 | 8/2010 | Phillips et al. |
| 7,828,690 B2 | 11/2010 | Wittkopp et al. |
| 7,841,960 B2 | 11/2010 | Baldwin |
| 7,846,057 B2 | 12/2010 | Shim |
| 7,846,058 B2 | 12/2010 | Kim |
| 7,850,568 B2 | 12/2010 | Shim |
| 7,850,569 B2 | 12/2010 | Seo et al. |
| 7,867,131 B2 | 1/2011 | Hart et al. |
| 7,887,453 B2 | 2/2011 | Phillips et al. |
| 7,887,454 B2 | 2/2011 | Phillips et al. |
| 7,896,774 B2 | 3/2011 | Phillips et al. |
| 7,909,726 B2 | 3/2011 | Phillips et al. |
| 7,909,729 B2 | 3/2011 | Tanaka et al. |
| 7,914,414 B2 | 3/2011 | Phillips et al. |
| 7,946,948 B2 | 5/2011 | Phillips et al. |
| 7,959,531 B2 | 6/2011 | Phillips et al. |
| 7,980,988 B2 | 7/2011 | Phillips et al. |
| 7,985,159 B2 | 7/2011 | Phillips et al. |
| 7,988,586 B2 | 8/2011 | Phillips et al. |
| 7,993,235 B2 | 8/2011 | Wittkopp et al. |
| 7,993,237 B2 | 8/2011 | Wittkopp et al. |
| 7,993,238 B2 | 8/2011 | Phillips et al. |
| 7,998,013 B2 | 8/2011 | Phillips et al. |
| 8,002,662 B2 | 8/2011 | Phillips et al. |
| 8,007,394 B2 | 8/2011 | Phillips et al. |
| 8,007,395 B2 | 8/2011 | Wittkopp et al. |
| 8,007,398 B2 | 8/2011 | Phillips et al. |
| 8,016,713 B2 | 9/2011 | Phillips et al. |
| 8,025,602 B2 | 9/2011 | Phillips et al. |
| 8,033,947 B2 | 10/2011 | Phillips et al. |
| 8,033,948 B2 | 10/2011 | Phillips et al. |
| 8,038,565 B2 | 10/2011 | Phillips et al. |
| 8,038,566 B2 | 10/2011 | Phillips et al. |
| 8,043,189 B2 | 10/2011 | Phillips et al. |
| 8,043,192 B2 | 10/2011 | Phillips et al. |
| 8,047,950 B2 | 11/2011 | Wittkopp et al. |
| 8,047,951 B2 | 11/2011 | Wittkopp et al. |
| 8,047,954 B2 | 11/2011 | Phillips et al. |
| 8,052,566 B2 | 11/2011 | Wittkopp et al. |
| 8,052,567 B2 | 11/2011 | Hart et al. |
| 8,057,349 B2 | 11/2011 | Phillips et al. |
| 8,070,644 B2 | 12/2011 | Wittkopp et al. |
| 8,070,646 B2 | 12/2011 | Hart et al. |
| 8,079,932 B2 | 12/2011 | Phillips et al. |
| 8,088,032 B2 | 1/2012 | Gumpoltsberger et al. |
| 8,096,915 B2 | 1/2012 | Wittkopp et al. |
| 8,100,808 B2 | 1/2012 | Wittkopp et al. |
| 8,105,198 B2 | 1/2012 | Hart et al. |
| 8,128,527 B2 | 3/2012 | Hart et al. |
| 8,142,324 B2 | 3/2012 | Phillips et al. |
| 8,142,325 B2 | 3/2012 | Phillips et al. |
| 8,152,681 B2 | 4/2012 | Seo et al. |
| 8,157,697 B2 | 4/2012 | Hart et al. |
| 8,167,765 B2 | 5/2012 | Phillips et al. |
| 8,167,766 B2 | 5/2012 | Phillips et al. |
| 8,177,675 B2 | 5/2012 | Wittkopp et al. |
| 8,187,130 B1 | 5/2012 | Mellet et al. |
| 8,187,137 B2 | 5/2012 | Carey et al. |
| 8,197,375 B1 | 6/2012 | Hart et al. |
| 8,197,376 B2 | 6/2012 | Gumpoltsberger et al. |
| 8,202,190 B2 | 6/2012 | Phillips et al. |
| 8,206,257 B2 | 6/2012 | Gumpoltsberger et al. |
| 8,210,981 B2 | 7/2012 | Bauknecht et al. |
| 8,210,982 B2 | 7/2012 | Gumpoltsberger et al. |
| 8,210,983 B2 | 7/2012 | Gumpoltsberger et al. |
| 8,231,495 B2 | 7/2012 | Gumpoltsberger et al. |
| 8,231,496 B2 | 7/2012 | Gumpoltsberger et al. |
| 8,231,501 B2 | 7/2012 | Gumpoltsberger et al. |
| 8,241,170 B2 | 8/2012 | Gumpoltsberger et al. |
| 8,241,171 B2 | 8/2012 | Gumpoltsberger et al. |
| 8,246,504 B2 | 8/2012 | Gumpoltsberger et al. |
| 8,251,856 B2 | 8/2012 | Phillips et al. |
| 8,251,857 B1 | 8/2012 | Mellet et al. |
| 8,251,859 B2 | 8/2012 | Gumpoltsberger et al. |
| 8,277,355 B2 | 10/2012 | Hart et al. |
| 8,287,420 B2 | 10/2012 | Gumpoltsberger et al. |
| 8,303,453 B2 | 11/2012 | Wittkopp et al. |
| 8,303,455 B2 | 11/2012 | Gumpoltsberger et al. |
| 8,303,456 B2 | 11/2012 | Kim |
| 8,328,678 B2 | 12/2012 | Seo et al. |
| 8,328,679 B2 | 12/2012 | Jang et al. |
| 8,333,676 B2 | 12/2012 | Kim |
| 8,343,005 B2 | 1/2013 | Hart et al. |
| 8,343,007 B2 | 1/2013 | Hart et al. |
| 8,353,801 B2 | 1/2013 | Hart et al. |
| 8,366,580 B2 | 2/2013 | Wittkopp et al. |
| 8,371,982 B2 | 2/2013 | Lee et al. |
| 8,376,893 B2 | 2/2013 | Wittkopp et al. |
| 8,376,895 B2 | 2/2013 | Saitoh et al. |
| 8,382,634 B2 | 2/2013 | Beck et al. |
| 8,398,522 B2 | 3/2013 | Bauknecht et al. |
| 8,403,803 B2 | 3/2013 | Gumpoltsberger et al. |
| 8,409,047 B2 | 4/2013 | Borgerson et al. |
| 8,414,445 B2 | 4/2013 | Carey et al. |
| 8,414,446 B2 | 4/2013 | Beck et al. |
| 8,419,587 B2 | 4/2013 | Gumpoltsberger et al. |
| 8,425,367 B2 | 4/2013 | Phillips et al. |
| 8,425,368 B2 | 4/2013 | Phillips et al. |
| 8,425,369 B2 | 4/2013 | Wittkopp et al. |
| 8,425,370 B2 | 4/2013 | Leesch et al. |
| 8,430,784 B2 | 4/2013 | Hart et al. |
| 8,430,785 B2 | 4/2013 | Beck et al. |
| 8,435,151 B2 | 5/2013 | Seo et al. |
| 8,435,153 B2 | 5/2013 | Phillips et al. |
| 8,444,524 B2 | 5/2013 | Gumpoltsberger et al. |
| 8,444,525 B2 | 5/2013 | Gumpoltsberger et al. |
| 8,460,151 B2 | 6/2013 | Wittkopp et al. |
| 8,465,390 B2 | 6/2013 | Brehmer et al. |
| 8,480,533 B2 | 7/2013 | Meyer et al. |
| 8,485,934 B2 | 7/2013 | Gumpoltsberger et al. |
| 8,496,556 B2 | 7/2013 | Wittkopp et al. |
| 8,496,558 B2 | 7/2013 | Wittkopp et al. |
| 8,506,442 B2 | 8/2013 | Mellet et al. |
| 8,506,443 B2 | 8/2013 | Seo et al. |
| 8,512,196 B2 | 8/2013 | Mellet et al. |
| 8,523,729 B2 | 9/2013 | Hart et al. |
| 8,529,394 B2 | 9/2013 | Gumpoltsberger et al. |
| 8,529,395 B2 | 9/2013 | Wittkopp et al. |
| 8,529,396 B1 | 9/2013 | Vernon et al. |
| 8,545,362 B1 | 10/2013 | Goleski et al. |

(56) References Cited

U.S. PATENT DOCUMENTS

| | | |
|---|---|---|
| 8,556,766 B2 | 10/2013 | Mellet et al. |
| 8,556,768 B2 | 10/2013 | Park et al. |
| 8,574,113 B1 | 11/2013 | Goleski |
| 8,574,114 B2 | 11/2013 | Brehmer et al. |
| 8,581,753 B2 | 11/2013 | Kim et al. |
| 8,591,364 B2 | 11/2013 | Hart |
| 8,591,376 B1 | 11/2013 | Shim et al. |
| 8,591,377 B1 | 11/2013 | Hoffman et al. |
| 8,596,442 B2 | 12/2013 | Watanabe et al. |
| 8,597,152 B2 | 12/2013 | Seo et al. |
| 8,597,153 B2 | 12/2013 | Saitoh et al. |
| 8,602,934 B2 | 12/2013 | Mellet et al. |
| 8,608,612 B2 | 12/2013 | Park et al. |
| 8,617,021 B1 | 12/2013 | Goleski et al. |
| 8,617,022 B1 | 12/2013 | Vernon et al. |
| 8,636,617 B2 | 1/2014 | Singh |
| 8,636,618 B2 | 1/2014 | Hart et al. |
| 8,647,227 B2 | 2/2014 | Park et al. |
| 8,651,994 B2 | 2/2014 | Bassi et al. |
| 8,657,717 B2 | 2/2014 | Gumpoltsberger et al. |
| 8,663,053 B2 | 3/2014 | Beck et al. |
| 8,663,055 B2 | 3/2014 | Brehmer et al. |
| 8,663,056 B2 | 3/2014 | Gumpoltsberger et al. |
| 8,678,972 B2 | 3/2014 | Wittkopp et al. |
| 8,690,722 B2 | 4/2014 | Phillips et al. |
| 8,702,544 B2 | 4/2014 | Tamai et al. |
| 8,702,554 B2 | 4/2014 | Gumpoltsberger et al. |
| 8,702,555 B1 | 4/2014 | Hart et al. |
| 8,708,862 B2 | 4/2014 | Scherer et al. |
| 8,721,488 B2 | 5/2014 | Mellet et al. |
| 8,721,492 B2 | 5/2014 | Fellmann et al. |
| 8,727,929 B2 | 5/2014 | Beck et al. |
| 8,734,285 B2 | 5/2014 | Wilton et al. |
| 8,734,286 B2 | 5/2014 | Coffey et al. |
| 8,758,187 B2 | 6/2014 | Mellet et al. |
| 8,758,189 B2 | 6/2014 | Hart et al. |
| 8,777,797 B2 | 7/2014 | Mellet et al. |
| 8,777,798 B2 | 7/2014 | Borgerson et al. |
| 8,801,563 B2 | 8/2014 | Ohnemus et al. |
| 8,801,565 B2 | 8/2014 | Hart et al. |
| 8,808,134 B2 | 8/2014 | Saitoh et al. |
| 8,808,135 B2 | 8/2014 | Vahabzadeh et al. |
| 8,821,336 B2 | 9/2014 | Wilton et al. |
| 8,827,860 B2 | 9/2014 | Mellet et al. |
| 8,845,476 B2 | 9/2014 | Coffey |
| 8,858,386 B2 | 10/2014 | Wittkopp et al. |
| 8,858,387 B2 | 10/2014 | Haupt et al. |
| 8,864,618 B1 | 10/2014 | Noh et al. |
| 8,888,648 B2 | 11/2014 | Mellet et al. |
| 8,894,535 B2 | 11/2014 | Mellet et al. |
| 8,894,536 B2 | 11/2014 | Beck et al. |
| 8,915,819 B2 | 12/2014 | Coffey et al. |
| 8,920,281 B2 | 12/2014 | Mellet et al. |
| 8,932,174 B2 | 1/2015 | Hart et al. |
| 8,939,863 B2 | 1/2015 | Hart et al. |
| 8,944,949 B2 | 2/2015 | Mellet et al. |
| 8,951,160 B2 | 2/2015 | Vernon et al. |
| 8,961,355 B2 | 2/2015 | Hart et al. |
| 8,961,356 B2 | 2/2015 | Bockenstette et al. |
| 8,968,142 B2 | 3/2015 | Lippert |
| 8,968,144 B2 | 3/2015 | Janson et al. |
| 8,968,145 B2 | 3/2015 | Mellet et al. |
| 8,979,701 B2 | 3/2015 | Baldwin |
| 8,986,153 B2 | 3/2015 | Park et al. |
| 8,992,373 B2 | 3/2015 | Beck et al. |
| 8,992,374 B2 | 3/2015 | Shibamura et al. |
| 9,011,287 B2 | 4/2015 | Meyer et al. |
| 9,039,562 B2 | 5/2015 | Beck et al. |
| 9,039,565 B2 | 5/2015 | Lee |
| 9,050,882 B2 | 6/2015 | Mellet et al. |
| 9,091,330 B2 | 7/2015 | Singh |
| 9,133,913 B2 | 9/2015 | Mellet et al. |
| 9,140,336 B2 | 9/2015 | Goleski |
| 9,175,747 B2 | 11/2015 | Lippert et al. |
| 9,175,748 B2 | 11/2015 | Goleski et al. |
| 9,175,751 B2 | 11/2015 | Beck et al. |
| 9,194,464 B2 | 11/2015 | Beck et al. |
| 9,206,884 B2 | 12/2015 | Beck et al. |
| 9,222,549 B2 | 12/2015 | Mellet et al. |
| 9,322,460 B1 | 4/2016 | Ji et al. |
| 9,328,804 B1 | 5/2016 | Ji et al. |
| 9,353,833 B2 | 5/2016 | Beck et al. |
| 9,366,319 B2 | 6/2016 | Lippert |
| 9,377,086 B2 | 6/2016 | Beck et al. |
| 9,423,006 B2 | 8/2016 | Beck et al. |
| 9,429,215 B2 | 8/2016 | Noh et al. |
| 9,435,405 B2 | 9/2016 | Etchason |
| 9,488,269 B2 | 11/2016 | Yoshida et al. |
| 9,500,263 B2 | 11/2016 | Ogauchi |
| 9,528,573 B2 | 12/2016 | Baldwin |
| 9,562,589 B2 | 2/2017 | Beck et al. |
| 9,568,069 B2 | 2/2017 | Beck et al. |
| 9,587,716 B1 | 3/2017 | Park et al. |
| 9,599,195 B2 | 3/2017 | Beck et al. |
| 9,618,090 B2 | 4/2017 | Cho et al. |
| 9,651,115 B2 | 5/2017 | Lee et al. |
| 9,657,814 B2 | 5/2017 | Beck et al. |
| 9,670,992 B2 | 6/2017 | Cho et al. |
| 9,702,439 B2 | 7/2017 | Kook et al. |
| 9,726,256 B2 | 8/2017 | Muller et al. |
| 9,752,659 B2 | 9/2017 | Ji et al. |
| 9,759,291 B2 | 9/2017 | Beck et al. |
| 9,777,802 B2 | 10/2017 | Lippert et al. |
| 9,784,344 B1 | 10/2017 | Cho et al. |
| 9,803,725 B2 | 10/2017 | Foster et al. |
| 9,816,590 B2 | 11/2017 | Lee et al. |
| 9,822,848 B2 | 11/2017 | Kwon et al. |
| 9,822,852 B2 | 11/2017 | Ji et al. |
| 9,822,853 B2 | 11/2017 | Cho et al. |
| 9,822,857 B2 | 11/2017 | Park et al. |
| 9,845,845 B2 | 12/2017 | Ji et al. |
| 9,850,985 B2 | 12/2017 | Cho et al. |
| 9,850,986 B2 | 12/2017 | Ji et al. |
| 9,856,947 B2 | 1/2018 | Beck et al. |
| 9,856,954 B2 | 1/2018 | Park et al. |
| 9,869,377 B1 | 1/2018 | Burchett et al. |
| 9,890,834 B2 | 2/2018 | Park et al. |
| 9,927,008 B1 | 3/2018 | Burchett et al. |
| 9,927,009 B2 | 3/2018 | Foster et al. |
| 9,933,045 B1 | 4/2018 | Horen et al. |
| 9,933,047 B1 | 4/2018 | Cho et al. |
| 9,958,035 B2 | 5/2018 | Ji et al. |
| 10,060,511 B2 | 8/2018 | Irving et al. |
| 10,060,512 B2 | 8/2018 | Raszkowski et al. |
| 10,066,706 B2 | 9/2018 | Foster et al. |
| 10,072,735 B2 | 9/2018 | Crafton et al. |
| 10,072,736 B2 | 9/2018 | Burchett et al. |
| 10,072,737 B2 | 9/2018 | Foster et al. |
| 10,156,283 B2 | 12/2018 | Raszkowski et al. |
| 10,161,484 B2 | 12/2018 | Tryon et al. |
| 10,161,486 B2 | 12/2018 | Irving et al. |
| 10,174,814 B2 | 1/2019 | Schoolcraft et al. |
| 10,215,261 B2 | 2/2019 | Hwang et al. |
| 10,234,001 B2 | 3/2019 | Earhart et al. |
| 10,247,280 B2 | 4/2019 | Hoffman et al. |
| 10,253,850 B2 | 4/2019 | Irving et al. |
| 10,260,599 B2 | 4/2019 | Richardson et al. |
| 10,302,173 B2 | 5/2019 | Tryon et al. |
| 10,316,940 B2 | 6/2019 | Crafton |
| 10,323,722 B2 | 6/2019 | Schoolcraft et al. |
| 10,323,723 B2 | 6/2019 | Earhart et al. |
| 10,337,590 B2 | 7/2019 | Irving et al. |
| 10,337,591 B2 | 7/2019 | Irving et al. |
| 10,344,833 B2 | 7/2019 | Irving et al. |
| 10,352,407 B2 | 7/2019 | Horen et al. |
| 10,359,101 B2 | 7/2019 | Irving et al. |
| 10,364,867 B2 | 7/2019 | Tryon et al. |
| 10,364,868 B2 | 7/2019 | Irving et al. |
| 2004/0048716 A1 | 3/2004 | Ziemer |
| 2005/0113205 A1 | 5/2005 | Oguri et al. |
| 2006/0205556 A1 | 9/2006 | Klemen |
| 2006/0223666 A1 | 10/2006 | Gumpoltsberger |
| 2007/0207891 A1 | 9/2007 | Gumpoltsberger |
| 2007/0213168 A1 | 9/2007 | Gumpoltsberger |

(56) References Cited

U.S. PATENT DOCUMENTS

| | | |
|---|---|---|
| 2008/0070740 A1 | 3/2008 | Gumpoltsberger |
| 2008/0125269 A1 | 5/2008 | Gumpoltsberger |
| 2008/0242494 A1 | 10/2008 | Wittkopp et al. |
| 2008/0300092 A1 | 12/2008 | Phillips et al. |
| 2009/0011891 A1 | 1/2009 | Phillips et al. |
| 2009/0017964 A1 | 1/2009 | Phillips et al. |
| 2009/0017965 A1 | 1/2009 | Phillips et al. |
| 2009/0017966 A1 | 1/2009 | Phillips et al. |
| 2009/0017971 A1 | 1/2009 | Phillips et al. |
| 2009/0017976 A1 | 1/2009 | Phillips et al. |
| 2009/0017977 A1 | 1/2009 | Phillips et al. |
| 2009/0017979 A1 | 1/2009 | Phillips et al. |
| 2009/0017980 A1 | 1/2009 | Phillips et al. |
| 2009/0036253 A1 | 2/2009 | Phillips et al. |
| 2009/0048059 A1 | 2/2009 | Phillips et al. |
| 2009/0048062 A1 | 2/2009 | Seo et al. |
| 2009/0054196 A1 | 2/2009 | Phillips et al. |
| 2009/0118057 A1 | 5/2009 | Wittkopp et al. |
| 2009/0118059 A1 | 5/2009 | Phillips et al. |
| 2009/0118062 A1 | 5/2009 | Phillips et al. |
| 2009/0124448 A1 | 5/2009 | Wittkopp et al. |
| 2009/0192009 A1 | 7/2009 | Phillips et al. |
| 2009/0192010 A1 | 7/2009 | Wittkopp et al. |
| 2009/0192011 A1 | 7/2009 | Wittkopp et al. |
| 2009/0192012 A1 | 7/2009 | Phillips et al. |
| 2009/0197733 A1 | 8/2009 | Phillips et al. |
| 2009/0197734 A1 | 8/2009 | Phillips et al. |
| 2009/0209387 A1 | 8/2009 | Phillips et al. |
| 2009/0209389 A1 | 8/2009 | Phillips et al. |
| 2009/0215580 A1 | 8/2009 | Hart et al. |
| 2009/0280947 A1 | 11/2009 | Seo et al. |
| 2010/0041508 A1 | 2/2010 | Gumpoltsberger et al. |
| 2010/0041509 A1 | 2/2010 | Gumpoltsberger et al. |
| 2010/0069195 A1 | 3/2010 | Baldwin |
| 2010/0190600 A1 | 7/2010 | Phillips et al. |
| 2010/0210392 A1 | 8/2010 | Hart et al. |
| 2010/0210393 A1 | 8/2010 | Phillips et al. |
| 2010/0210394 A1 | 8/2010 | Phillips et al. |
| 2010/0210395 A1 | 8/2010 | Phillips et al. |
| 2010/0210396 A1 | 8/2010 | Wittkopp et al. |
| 2010/0210397 A1 | 8/2010 | Wittkopp et al. |
| 2010/0210398 A1 | 8/2010 | Hart et al. |
| 2010/0210400 A1 | 8/2010 | Phillips et al. |
| 2010/0210401 A1 | 8/2010 | Phillips et al. |
| 2010/0210402 A1 | 8/2010 | Phillips et al. |
| 2010/0210403 A1 | 8/2010 | Wittkopp et al. |
| 2010/0210404 A1 | 8/2010 | Phillips et al. |
| 2010/0210405 A1 | 8/2010 | Phillips et al. |
| 2010/0210406 A1 | 8/2010 | Phillips et al. |
| 2010/0216589 A1 | 8/2010 | Hart et al. |
| 2010/0216590 A1 | 8/2010 | Phillips et al. |
| 2010/0216591 A1 | 8/2010 | Wittkopp et al. |
| 2010/0227729 A1 | 9/2010 | Wittkopp et al. |
| 2010/0279814 A1 | 11/2010 | Brehmer et al. |
| 2010/0331136 A1 | 12/2010 | Jang et al. |
| 2011/0009229 A1 | 1/2011 | Bauknecht et al. |
| 2011/0045936 A1 | 2/2011 | Gumpoltsberger et al. |
| 2011/0045937 A1 | 2/2011 | Gumpoltsberger et al. |
| 2011/0045938 A1 | 2/2011 | Gumpoltsberger et al. |
| 2011/0045939 A1 | 2/2011 | Gumpoltsberger et al. |
| 2011/0045940 A1 | 2/2011 | Gumpoltsberger et al. |
| 2011/0045942 A1 | 2/2011 | Gumpoltsberger et al. |
| 2011/0045943 A1 | 2/2011 | Gumpoltsberger et al. |
| 2011/0124462 A1 | 5/2011 | Meyer et al. |
| 2011/0136615 A1 | 6/2011 | Phillips et al. |
| 2011/0183807 A1 | 7/2011 | Gumpoltsberger et al. |
| 2011/0212806 A1 | 9/2011 | Phillips et al. |
| 2011/0245013 A1 | 10/2011 | Kim |
| 2011/0245026 A1 | 10/2011 | Phillips et al. |
| 2011/0251014 A1 | 10/2011 | Leesch et al. |
| 2011/0275472 A1 | 11/2011 | Phillips et al. |
| 2011/0294617 A1 | 12/2011 | Seo et al. |
| 2012/0004066 A1 | 1/2012 | Seo et al. |
| 2012/0053004 A1 | 3/2012 | Beck et al. |
| 2012/0053005 A1 | 3/2012 | Beck et al. |
| 2012/0053008 A1 | 3/2012 | Beck et al. |
| 2012/0058856 A1 | 3/2012 | Phillips et al. |
| 2012/0065019 A1 | 3/2012 | Hart et al. |
| 2012/0108382 A1 | 5/2012 | Saitoh et al. |
| 2012/0108383 A1 | 5/2012 | Saitoh et al. |
| 2012/0115671 A1 | 5/2012 | Gumpoltsberger et al. |
| 2012/0115672 A1 | 5/2012 | Gumpoltsberger et al. |
| 2012/0122626 A1 | 5/2012 | Gumpoltsberger et al. |
| 2012/0122627 A1 | 5/2012 | Gumpoltsberger et al. |
| 2012/0135834 A1 | 5/2012 | Gumpoltsberger et al. |
| 2012/0135835 A1 | 5/2012 | Gumpoltsberger et al. |
| 2012/0149525 A1 | 6/2012 | Gumpoltsberger et al. |
| 2012/0149526 A1 | 6/2012 | Gumpoltsberger et al. |
| 2012/0149527 A1 | 6/2012 | Gumpoltsberger et al. |
| 2012/0172172 A1 | 7/2012 | Gumpoltsberger et al. |
| 2012/0178564 A1 | 7/2012 | Vahabzadeh et al. |
| 2012/0178572 A1 | 7/2012 | Hart |
| 2012/0178578 A1 | 7/2012 | Mellet et al. |
| 2012/0178579 A1 | 7/2012 | Hart et al. |
| 2012/0178580 A1 | 7/2012 | Wittkopp et al. |
| 2012/0178581 A1 | 7/2012 | Wittkopp et al. |
| 2012/0178582 A1 | 7/2012 | Wittkopp et al. |
| 2012/0196718 A1 | 8/2012 | Hart et al. |
| 2012/0214632 A1 | 8/2012 | Mellet et al. |
| 2012/0214633 A1 | 8/2012 | Mellet et al. |
| 2012/0214636 A1 | 8/2012 | Hart et al. |
| 2012/0214637 A1 | 8/2012 | Hart et al. |
| 2012/0214638 A1 | 8/2012 | Hart et al. |
| 2012/0231917 A1 | 9/2012 | Phillips et al. |
| 2012/0231920 A1 | 9/2012 | Wittkopp et al. |
| 2012/0295754 A1 | 11/2012 | Hart et al. |
| 2012/0329600 A1 | 12/2012 | Park et al. |
| 2013/0029799 A1 | 1/2013 | Park et al. |
| 2013/0040776 A1 | 2/2013 | Mellet et al. |
| 2013/0085031 A1 | 4/2013 | Bassi et al. |
| 2013/0085033 A1 | 4/2013 | Wittkopp et al. |
| 2013/0150203 A1 | 6/2013 | Park et al. |
| 2013/0150204 A1 | 6/2013 | Park et al. |
| 2013/0187796 A1 | 7/2013 | Kim et al. |
| 2013/0203549 A1 | 8/2013 | Mellet et al. |
| 2013/0237365 A1 | 9/2013 | Coffey et al. |
| 2013/0252780 A1 | 9/2013 | Ohnemus et al. |
| 2013/0274058 A1 | 10/2013 | Beck et al. |
| 2013/0274060 A1 | 10/2013 | Beck et al. |
| 2013/0310211 A1 | 11/2013 | Wilton et al. |
| 2014/0106925 A1 | 4/2014 | Mellet et al. |
| 2014/0179487 A1 | 6/2014 | Thomas et al. |
| 2014/0221148 A1 | 8/2014 | Thomas et al. |
| 2014/0371027 A1* | 12/2014 | Goleski .............. F16H 3/62 475/288 |
| 2015/0080168 A1 | 3/2015 | Beck et al. |
| 2015/0087467 A1 | 3/2015 | Singh |
| 2015/0087468 A1 | 3/2015 | Beck et al. |
| 2015/0094185 A1 | 4/2015 | Beck et al. |
| 2015/0119185 A1 | 4/2015 | Lippert |
| 2015/0133258 A1 | 5/2015 | Beck et al. |
| 2015/0226290 A1 | 8/2015 | Lippert |
| 2015/0267781 A1 | 9/2015 | Meyer et al. |
| 2015/0267782 A1 | 9/2015 | Beck et al. |
| 2015/0337925 A1 | 11/2015 | Hoffman et al. |
| 2016/0040754 A1 | 2/2016 | Schoolcraft |
| 2016/0047440 A1 | 2/2016 | Long et al. |
| 2016/0053865 A1 | 2/2016 | Beck et al. |
| 2016/0053868 A1 | 2/2016 | Beck et al. |
| 2016/0053869 A1 | 2/2016 | Beck et al. |
| 2016/0061298 A1 | 3/2016 | Beck et al. |
| 2016/0084353 A1 | 3/2016 | Beck et al. |
| 2016/0084356 A1 | 3/2016 | Beck et al. |
| 2016/0091058 A1 | 3/2016 | Noh et al. |
| 2016/0108997 A1 | 4/2016 | Ogauchi et al. |
| 2016/0116025 A1 | 4/2016 | Muller et al. |
| 2016/0116026 A1 | 4/2016 | Muller et al. |
| 2016/0116027 A1 | 4/2016 | Muller et al. |
| 2016/0116028 A1 | 4/2016 | Muller et al. |
| 2016/0116029 A1 | 4/2016 | Muller et al. |
| 2016/0138680 A1 | 5/2016 | Schoolcraft |
| 2016/0138681 A1 | 5/2016 | Schoolcraft |
| 2016/0138682 A1 | 5/2016 | Schoolcraft |
| 2016/0160963 A1 | 6/2016 | Ji et al. |

(56) References Cited

U.S. PATENT DOCUMENTS

| | | |
|---|---|---|
| 2016/0169343 A1 | 6/2016 | Cho et al. |
| 2016/0245370 A1 | 8/2016 | Beck et al. |
| 2016/0312861 A1 | 10/2016 | Foster et al. |
| 2016/0333971 A1 | 11/2016 | Cho et al. |
| 2016/0333982 A1* | 11/2016 | Hwang ............... F16H 3/66 |
| 2016/0341289 A1 | 11/2016 | Kato et al. |
| 2016/0356342 A1 | 12/2016 | Hwang et al. |
| 2016/0363192 A1 | 12/2016 | Lee et al. |
| 2017/0074373 A1 | 3/2017 | Park et al. |
| 2017/0108091 A1 | 4/2017 | Cho et al. |
| 2017/0114868 A1 | 4/2017 | Hwang et al. |
| 2017/0159758 A1 | 6/2017 | Kook et al. |
| 2017/0159774 A1 | 6/2017 | Park et al. |
| 2017/0167576 A1* | 6/2017 | Hwang ............... F16H 3/66 |
| 2017/0268612 A1 | 9/2017 | Cho et al. |
| 2018/0003269 A1 | 1/2018 | Kook et al. |
| 2018/0087605 A1 | 3/2018 | Schoolcraft et al. |
| 2018/0087606 A1 | 3/2018 | Richardson et al. |
| 2018/0087607 A1 | 3/2018 | Tryon et al. |
| 2018/0087608 A1 | 3/2018 | Crafton et al. |
| 2018/0087609 A1 | 3/2018 | Horen et al. |
| 2018/0087610 A1 | 3/2018 | Tryon et al. |
| 2018/0087611 A1 | 3/2018 | Schoolcraft et al. |
| 2018/0087612 A1 | 3/2018 | Irving et al. |
| 2018/0087613 A1 | 3/2018 | Earhart et al. |
| 2018/0087614 A1 | 3/2018 | Burchett et al. |
| 2018/0087615 A1 | 3/2018 | Burchett et al. |
| 2018/0087616 A1 | 3/2018 | Raszkowski et al. |
| 2018/0087618 A1 | 3/2018 | Raszkowski et al. |
| 2018/0087619 A1 | 3/2018 | Earhart et al. |
| 2018/0087620 A1 | 3/2018 | Foster et al. |
| 2018/0087621 A1 | 3/2018 | Irving et al. |
| 2018/0087622 A1 | 3/2018 | Tryon et al. |
| 2018/0087623 A1 | 3/2018 | Irving et al. |
| 2018/0087624 A1 | 3/2018 | Schoolcraft et al. |
| 2018/0087625 A1 | 3/2018 | Crafton |
| 2018/0087626 A1 | 3/2018 | Irving |
| 2018/0094703 A1 | 4/2018 | Irving et al. |
| 2018/0094704 A1 | 4/2018 | Irving et al. |
| 2018/0094705 A1 | 4/2018 | Irving et al. |
| 2018/0094706 A1 | 4/2018 | Irving et al. |
| 2018/0094707 A1 | 4/2018 | Irving et al. |
| 2018/0347671 A1 | 12/2018 | Raszkowski et al. |
| 2019/0078657 A1* | 3/2019 | Kwon ............... F16H 3/66 |
| 2019/0085949 A1* | 3/2019 | Kwon ............... F16H 3/66 |
| 2019/0107176 A1 | 4/2019 | Irving et al. |
| 2019/0234493 A1 | 8/2019 | Tryon et al. |
| 2019/0249755 A1 | 8/2019 | Crafton |
| 2019/0264782 A1 | 8/2019 | Schoolcraft et al. |

FOREIGN PATENT DOCUMENTS

| | | |
|---|---|---|
| DE | 102005032879 A1 | 1/2007 |
| DE | 102005032881 A1 | 1/2007 |
| DE | 102008015750 A1 | 10/2008 |
| DE | 102008019356 A1 | 11/2008 |
| DE | 102008026831 A1 | 1/2009 |
| DE | 102009019046 A1 | 11/2010 |
| DE | 102009028686 A1 | 2/2011 |
| DE | 102010063501 A1 | 6/2012 |
| DE | 102014217052 A1 | 3/2016 |
| EP | 2467620 A1 | 6/2012 |
| EP | 2817536 A1 | 12/2014 |
| JP | 2009-197927 A | 9/2009 |
| WO | 2011/020891 A1 | 2/2011 |
| WO | 2013/090218 A1 | 6/2013 |
| WO | 2013/124083 A1 | 8/2013 |
| WO | 2014/185831 A1 | 11/2014 |
| WO | 2015/108028 A1 | 7/2015 |
| WO | 2016/015945 A1 | 2/2016 |

OTHER PUBLICATIONS

Thomas Belz: "Varianten von Mehrgang-Planetengetrieben", Mar. 8, 2016 (Mar. 8, 2016), XP055257458, Retrieved from the Internet: URL:https://register.epo.org/application?documentid= EYPWMGE67270DSU&appnumber=EP13756488&showPdfPage= all [retrieved on Mar. 11, 2016], 42 pages.

\* cited by examiner

FIG. 2

CLUTCH APPLY TABLE

| RANGE | RATIO | STEP | 162 | 164 | 166 | 168 | 170 | 172 |
|---|---|---|---|---|---|---|---|---|
| REV | -2.66 |  | 1 | 1 |  |  |  |  |
| 1 | 3.32 | -0.80 | 1 |  |  |  | 1 |  |
| 2 | 2.35 | 1.41 | 1 |  |  | 1 | 1 |  |
| 3 | 1.73 | 1.36 | 1 |  |  | 1 |  | 1 |
| 4 | 1.36 | 1.27 |  |  | 1 |  |  |  |
| 5 | 1.00 | 1.36 |  | 1 | 1 | 1 |  |  |
| 6 | 0.84 | 1.18 |  | 1 | 1 |  | 1 |  |
| 7 | 0.71 | 1.19 |  | 1 |  | 1 |  |  |
| 8 | 0.61 | 1.16 |  |  | 1 |  | 1 |  |
| 9 | 0.49 | 1.23 |  | 1 |  | 1 |  |  |
| 10 | 0.42 | 1.19 |  |  |  |  |  | 1 |

"1" = ENGAGED CONFIGURATION
"BLANK" = DISENGAGED CONFIGURATION

400

CLUTCH APPLY TABLE

| RANGE | RATIO | STEP | 362 | 364 | 366 | 368 | 370 | 372 |
|-------|-------|------|-----|-----|-----|-----|-----|-----|
| REV | -3.34 |  | 1 | 1 |  |  |  |  |
| 1 | 3.54 | -0.94 | 1 |  |  |  | 1 |  |
| 2 | 2.46 | 1.44 | 1 |  |  | 1 |  | 1 |
| 3 | 1.86 | 1.32 | 1 |  | 1 | 1 |  |  |
| 4 | 1.34 | 1.39 |  | 1 | 1 | 1 |  |  |
| 5 | 1.00 | 1.34 |  | 1 | 1 |  |  |  |
| 6 | 0.87 | 1.15 |  | 1 | 1 |  | 1 |  |
| 7 | 0.76 | 1.14 |  |  |  | 1 | 1 |  |
| 8 | 0.64 | 1.20 |  | 1 |  | 1 |  | 1 |
| 9 | 0.49 | 1.30 |  |  |  |  | 1 |  |
| 10 | 0.43 | 1.15 |  |  |  | 1 |  | 1 |

"1" = ENGAGED CONFIGURATION
"BLANK" = DISENGAGED CONFIGURATION

FIG. 4

| RANGE | RATIO | STEP | 562 | 564 | 566 | 568 | 570 | 572 |
|---|---|---|---|---|---|---|---|---|
| REV | -3.02 |  | 1 | 1 |  |  | 1 |  |
| 1 | 3.43 | -0.88 | 1 |  |  |  | 1 | 1 |
| 2 | 2.46 | 1.40 | 1 |  |  | 1 | 1 |  |
| 3 | 1.86 | 1.32 | 1 |  | 1 | 1 |  |  |
| 4 | 1.34 | 1.39 |  | 1 | 1 | 1 |  |  |
| 5 | 1.00 | 1.34 |  | 1 | 1 |  | 1 |  |
| 6 | 0.86 | 1.16 |  | 1 | 1 |  |  | 1 |
| 7 | 0.74 | 1.16 |  | 1 |  | 1 | 1 |  |
| 8 | 0.61 | 1.22 |  | 1 |  | 1 |  | 1 |
| 9 | 0.46 | 1.32 |  |  | 1 | 1 |  | 1 |
| 10 | 0.40 | 1.15 |  |  |  | 1 | 1 | 1 |

CLUTCH APPLY TABLE

"1" = ENGAGED CONFIGURATION
"BLANK" = DISENGAGED CONFIGURATION

FIG. 6

MULTI-SPEED PLANETARY TRANSMISSION

FIELD OF THE DISCLOSURE

This application is a divisional application of U.S. patent application Ser. No. 15/278,694, filed Sep. 28, 2016, titled MULTI-SPEED PLANETARY TRANSMISSION, the entire disclosure of which is expressly incorporated by reference herein.

BACKGROUND OF THE DISCLOSURE

Multi-speed transmissions use a plurality of planetary gearsets, selective couplers, interconnectors, and additional elements to achieve a plurality of forward and reverse speed ratios. Exemplary multi-speed transmissions are disclosed in US Published Patent Application No. 2016/0047440, Ser. No. 14/457,592, titled MULTI-SPEED TRANSMISSION, filed Aug. 12, 2014, the entire disclosure of which is expressly incorporated by reference herein.

SUMMARY

The present disclosure provides a multi-speed transmission including a plurality of planetary gearsets and a plurality of selective couplers to achieve at least nine forward speed ratios. The plurality of planetary gearsets may include a first planetary gearset, a second planetary gearset, a third planetary gearset, and a fourth planetary gearset. The plurality of selective couplers may include a number of clutches and a number of brakes. In one example, the present disclosure provides a multi-speed transmission having four planetary gearsets and six selective couplers. The six selective couplers may include four clutches and two brakes.

In some instances throughout this disclosure and in the claims, numeric terminology, such as first, second, third, and fourth, is used in reference to various gearsets, gears, gearset components, interconnectors, selective couplers, and other components. Such use is not intended to denote an ordering of the components. Rather, numeric terminology is used to assist the reader in identifying the component being referenced and should not be narrowly interpreted as providing a specific order of components. For example, a first planetary gearset identified in the drawings may support any one of the plurality of planetary gearsets recited in the claims, including the first planetary gearset, the second planetary gearset, the third planetary gearset, and the fourth planetary gearset, depending on the language of the claims.

According to an exemplary embodiment of the present disclosure, a transmission is provided. The transmission comprising at least one stationary member; an input member; a plurality of planetary gearsets operatively coupled to the input member; a plurality of selective couplers operatively coupled to the plurality of planetary gearsets; and an output member operatively coupled to the input member through the plurality of planetary gearsets. Each planetary gearset of the plurality of planetary gearsets includes a sun gear, a plurality of planet gears operatively coupled to the sun gear, a planet carrier operatively coupled to the plurality of planet gears, and a ring gear operatively coupled to the plurality of planet gears. The plurality of planetary gearsets includes a first planetary gearset, a second planetary gearset, a third planetary gearset, and a fourth planetary gearset. Each of the plurality of selective couplers has an engaged configuration and a disengaged configuration. The plurality of selective couplers including a first number of clutches and a second number of brakes, the first number being greater than the second number. The input member is operatively coupled to the plurality of planetary gearsets only through a subset of the first number of clutches, the subset including a first clutch, a second clutch, and a third clutch. The first clutch, when engaged, fixedly couples the input member to a first group of the plurality of planetary gearsets. The second clutch, when engaged, fixedly couples the input member to a second group of the plurality of planetary gearsets. The third clutch, when engaged, fixedly couples the input member to a third group of the plurality of planetary gearsets. Each of the first planetary gearset, the second planetary gearset, the third planetary gearset, and the fourth planetary gearset are included in at least one of the first group of the plurality of planetary gearsets, the second group of the plurality of planetary gearsets, and the third group of the plurality of planetary gearsets.

According to another exemplary embodiment of the present disclosure, a transmission is provided. The transmission comprising at least one stationary member; an input member rotatable relative to the at least one stationary member; a plurality of planetary gearsets operatively coupled to the input member; and an output member operatively coupled to the input member through the plurality of planetary gearsets and rotatable relative to the at least one stationary member. Each of the plurality of planetary gearsets includes a first gearset component, a second gearset component, and a third gearset component. The plurality of planetary gearsets includes a first planetary gearset, a second planetary gearset, a third planetary gearset, and a fourth planetary gearset. The output member is fixedly coupled to the second gearset component of the fourth planetary gearset. The transmission further comprising a first interconnector which fixedly couples the first gearset component of the second planetary gearset, the first gearset component of the third planetary gearset, and the first gearset component of the fourth planetary gearset together; a second interconnector which fixedly couples the third gearset component of the fourth planetary gearset to the second gearset component of the second planetary gearset; a third interconnector which fixedly couples the third gearset component of the first planetary gearset to the third gearset component of the second planetary gearset; a fourth interconnector which fixedly couples the second gearset component of the first planetary gearset to the second gearset component of the third planetary gearset; and a plurality of selective couplers. The plurality of selective couplers includes: a first selective coupler which, when engaged, fixedly couples the first gearset component of the second planetary gearset, the first gearset component of the third planetary gearset, and the first gearset component of the fourth planetary gearset to the at least one stationary member; a second selective coupler which, when engaged, fixedly couples the third gearset component of the third planetary gearset to the at least one stationary member; a third selective coupler which, when engaged, fixedly couples the input member to the third gearset component of the fourth planetary gearset and to the second gearset component of the second planetary gearset; a fourth selective coupler which, when engaged, fixedly couples the input member to the second gearset component of the first planetary gearset and to the second gearset component of the third planetary gearset; a fifth selective coupler which, when engaged, fixedly couples the input member to the first gearset component of the first planetary gearset; and a sixth selective coupler which, when engaged, fixedly couples the first gearset component of the first planetary gearset to the third gearset component of the third planetary gearset.

According to yet another exemplary embodiment of the present disclosure, a transmission is provided. The transmission comprising at least one stationary member; an input member rotatable relative to the at least one stationary member; a plurality of planetary gearsets operatively coupled to the input member; and an output member operatively coupled to the input member through the plurality of planetary gearsets and rotatable relative to the at least one stationary member. Each of the plurality of planetary gearsets includes a first gearset component, a second gearset component, and a third gearset component. The plurality of planetary gearsets includes a first planetary gearset, a second planetary gearset, a third planetary gearset, and a fourth planetary gearset. The output member is fixedly coupled to the third gearset component of the fourth planetary gearset. The transmission further comprising a first interconnector which fixedly couples the first gearset component of the fourth planetary gearset, the third gearset component of the third planetary gearset, and the third gearset component of the second planetary gearset together; a second interconnector which fixedly couples the second gearset component of the second planetary gearset to the second gearset component of the fourth planetary gearset; a third interconnector which fixedly couples the first gearset component of the first planetary gearset to the first gearset component of the second planetary gearset; a fourth interconnector which fixedly couples the second gearset component of the first planetary gearset to the second gearset component of the third planetary gearset; and a plurality of selective couplers. The plurality of selective couplers includes: a first selective coupler which, when engaged, fixedly couples the first gearset component of the first planetary gearset and the first gearset component of the second planetary gearset to the at least one stationary member; a second selective coupler which, when engaged, fixedly couples the third gearset component of the first planetary gearset to the at least one stationary member; a third selective coupler which, when engaged, fixedly couples the input member to the second gearset component of the fourth planetary gearset and to the second gearset component of the second planetary gearset; a fourth selective coupler which, when engaged, fixedly couples the input member to the second gearset component of the first planetary gearset and to the second gearset component of the third planetary gearset; a fifth selective coupler which, when engaged, fixedly couples the input member to the first gearset component of the third planetary gearset; and a sixth selective coupler which, when engaged, fixedly couples the first gearset component of the third planetary gearset to the third gearset component of the first planetary gearset.

According to yet a further exemplary embodiment of the present disclosure, a transmission is provided. The transmission comprising at least one stationary member; an input member rotatable relative to the at least one stationary member; a plurality of planetary gearsets operatively coupled to the input member; and an output member operatively coupled to the input member through the plurality of planetary gearsets and rotatable relative to the at least one stationary member. Each of the plurality of planetary gearsets includes a first gearset component, a second gearset component, and a third gearset component. The plurality of planetary gearsets includes a first planetary gearset, a second planetary gearset, a third planetary gearset, and a fourth planetary gearset. The output member is fixedly coupled to the third gearset component of the fourth planetary gearset and the second gearset component of the third planetary gearset. The transmission further comprising a first interconnector which fixedly couples the third gearset component of the third planetary gearset to the second gearset component of the fourth planetary gearset; a second interconnector which fixedly couples the first gearset component of the fourth planetary gearset to the third gearset component of the first planetary gearset; a third interconnector which fixedly couples the first gearset component of the third planetary gearset to the first gearset component of the second planetary gearset; a fourth interconnector which fixedly couples the second gearset component of the first planetary gearset to the second gearset component of the second planetary gearset; and a plurality of selective couplers. The plurality of selective couplers includes: a first selective coupler which, when engaged, fixedly couples the first gearset component of the third planetary gearset and the first gearset component of the second planetary gearset to the at least one stationary member; a second selective coupler which, when engaged, fixedly couples the third gearset component of the second planetary gearset to the at least one stationary member; a third selective coupler which, when engaged, fixedly couples the input member to the second gearset component of the fourth planetary gearset and to the third gearset component of the third planetary gearset; a fourth selective coupler which, when engaged, fixedly couples the input member to the second gearset component of the first planetary gearset and to the second gearset component of the second planetary gearset; a fifth selective coupler which, when engaged, fixedly couples the input member to the first gearset component of the first planetary gearset; and a sixth selective coupler which, when engaged, fixedly couples the first gearset component of the first planetary gearset to the third gearset component of the second planetary gearset.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIG. 2 is a truth table illustrating the selective engagement of the six selective couplers of FIG. 1 to provide ten forward gear or speed ratios and a reverse gear or speed ratio of the multi-speed transmission of FIG. 1;

FIG. 4 is a truth table illustrating the selective engagement of the six selective couplers of FIG. 3 to provide ten forward gear or speed ratios and a reverse gear or speed ratio of the multi-speed transmission of FIG. 3;

FIG. 6 is a truth table illustrating the selective engagement of the six selective couplers of FIG. 5 to provide ten forward gear or speed ratios and a reverse gear or speed ratio of the multi-speed transmission of FIG. 5.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
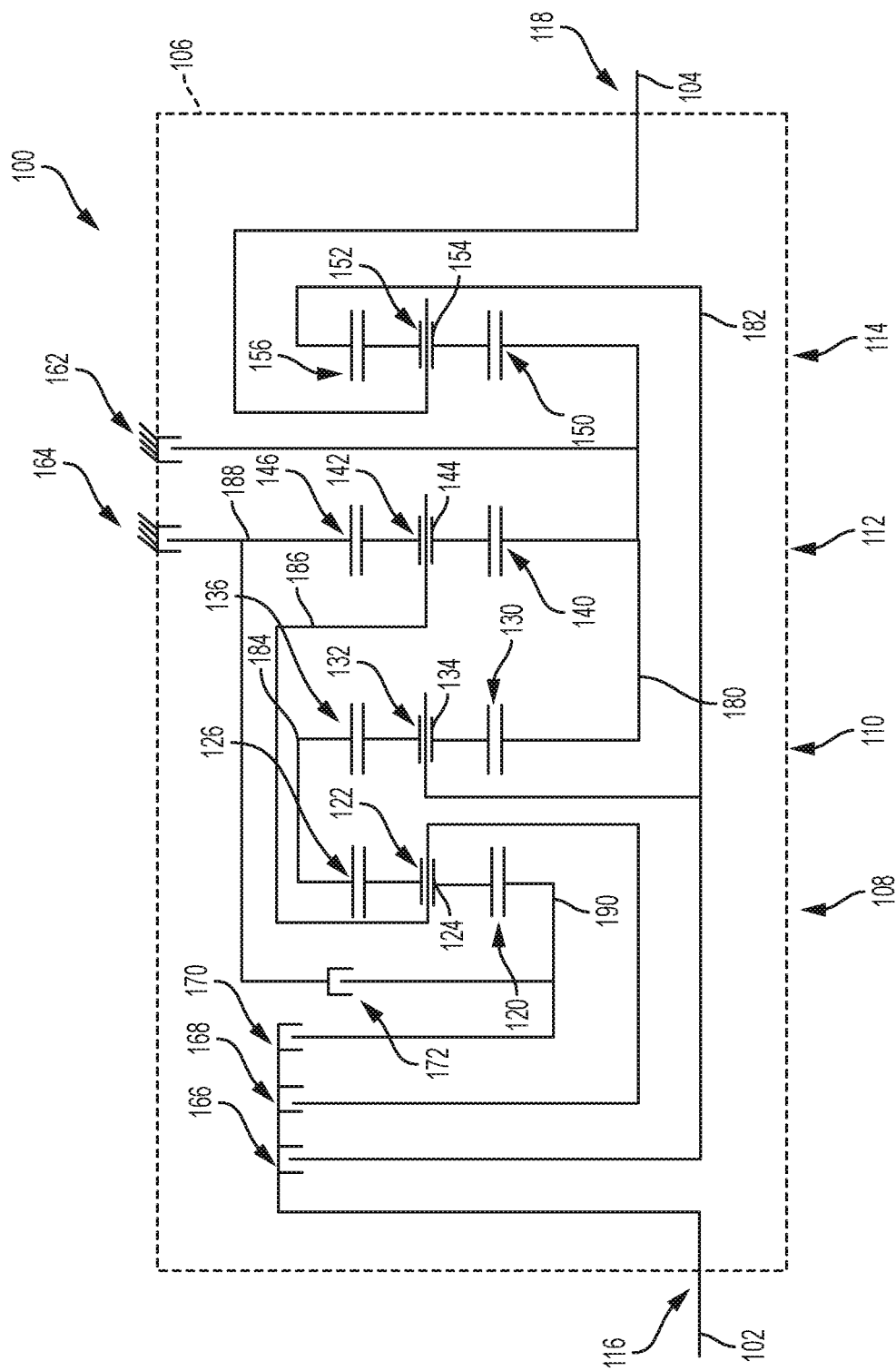
FIG. 1 is a diagrammatic view of a first exemplary multi-speed transmission including four planetary gearsets and six selective couplers.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In the illustrated transmission embodiments, selective couplers are disclosed. A selective coupler is a device which may be actuated to fixedly couple two or more components together. A selective coupler fixedly couples two or more components to rotate together as a unit when the selective coupler is in an engaged configuration. Further, the two or more components may be rotatable relative to each other when the selective coupler is in a disengaged configuration. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A first exemplary selective coupler is a clutch. A clutch couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch.

A second exemplary selective coupler is a brake. A brake couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in the above-incorporated US Published Patent Application No. 2016/0047440.

In addition to coupling through selective couplers, various components of the disclosed transmission embodiments may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

The disclosed transmission embodiments include a plurality of planetary gearsets. Each planetary gearset includes at least four components: a sun gear; a ring gear; a plurality of planet gears; and a carrier that is rotatably coupled to and carries the planet gears. In the case of a simple planetary gearset, the teeth of the sun gear are intermeshed with the teeth of the planet gears which are in turn engaged with the teeth of the ring gear. Each of these components may also be referred to as a gearset component. It will be apparent to one of skill in the art that some planetary gearsets may include further components than those explicitly identified. For example, one or more of the planetary gearsets may include two sets of planet gears. A first set of planet gears may intermesh with the sun gear while the second set of planet gears intermesh with the first set of planet gears and the ring gear. Both sets of planet gears are carried by the planet carrier.

One or more rotating components, such as shafts, drums, and other components, may be collectively referred to as an interconnector when the one or more components are fixedly coupled together. Interconnectors may further be fixedly coupled to one or more gearset components and/or one or more selective couplers.

An input member of the disclosed transmission embodiments is rotated by a prime mover. Exemplary prime movers include internal combustion engines, electric motors, hybrid power systems, and other suitable power systems. In one embodiment, the prime mover indirectly rotates the input member through a clutch and/or a torque converter. An output member of the disclosed transmission embodiments provides rotational power to one or more working components. Exemplary working components include one or more drive wheels of a motor vehicle, a power take-off shaft, and other suitable devices. The output member is rotated based on the interconnections of the gearset components and the selective couplers of the transmission. By changing the interconnections of the gearset components and the selective couplers, a rotation speed of the output member may be varied from a rotation speed of the input member.

The disclosed transmission embodiments are capable of transferring torque from the input member to the output member and rotating the output member in at least nine forward gear or speed ratios relative to the input member, illustratively ten forward gear or speed ratios for some embodiments, and one reverse gear or speed ratio wherein the rotation direction of the output member is reversed relative to its rotation direction for the at least nine forward ratios. Exemplary gear ratios that may be obtained using the embodiments of the present disclosure are disclosed herein. Of course, other gear ratios are achievable depending on the characteristics of the gearsets utilized. Exemplary characteristics include respective gear diameters, the number of gear teeth, and the configurations of the various gears.

FIG. 1 is a diagrammatic representation of a multi-speed transmission 100. Multi-speed transmission 100 includes an input member 102 and an output member 104. Each of input member 102 and output member 104 is rotatable relative to at least one stationary member 106. An exemplary input member 102 is an input shaft or other suitable rotatable component. An exemplary output member 104 is an output shaft or other suitable rotatable component. An exemplary stationary member 106 is a housing of multi-speed transmission 100. The housing may include several components coupled together.

Multi-speed transmission 100 includes a plurality of planetary gearsets, illustratively a first planetary gearset 108, a second planetary gearset 110, a third planetary gearset 112, and a fourth planetary gearset 114. In one embodiment, additional planetary gearsets may be included. Further, although first planetary gearset 108, second planetary gearset 110, third planetary gearset 112, and fourth planetary gearset 114 are illustrated as simple planetary gearsets, it is contemplated that compound planetary gearsets may be included in some embodiments.

In one embodiment, multi-speed transmission 100 is arranged as illustrated in FIG. 1, with first planetary gearset 108 positioned between a first location or end 116 at which input member 102 enters stationary member 106 and second planetary gearset 110, second planetary gearset 110 is positioned between first planetary gearset 108 and third planetary gearset 112, third planetary gearset 112 is positioned between second planetary gearset 110 and fourth planetary gearset 114, and fourth planetary gearset 114 is positioned between third planetary gearset 112 and a second location or end 118 at which output member 104 exits stationary member 106. In alternative embodiments, first planetary gearset 108, second planetary gearset 110, third planetary gearset 112, and fourth planetary gearset 114 are arranged in any order relative to location 116 and location 118. In the illustrated embodiment of FIG. 1, each of first planetary gearset 108, second planetary gearset 110, third planetary gearset 112, and fourth planetary gearset 114 are axially aligned. In one example, input member 102 and output member 104 are also axially aligned with first planetary gearset 108, second planetary gearset 110, third planetary gearset 112, and fourth planetary gearset 114. In alternative embodiments, one or more of input member 102, output member 104, first planetary gearset 108, second planetary gearset 110, third planetary gearset 112, and fourth planetary gearset 114 are offset and not axially aligned with the remainder.

First planetary gearset 108 includes a sun gear 120, a planet carrier 122 supporting a plurality of planet gears 124, and a ring gear 126. Second planetary gearset 110 includes a sun gear 130, a planet carrier 132 supporting a plurality of planet gears 134, and a ring gear 136. Third planetary gearset 112 includes a sun gear 140, a planet carrier 142 supporting a plurality of planet gears 144, and a ring gear 146. Fourth planetary gearset 114 includes a sun gear 150, a planet carrier 152 supporting a plurality of planet gears 154, and a ring gear 156.

Multi-speed transmission 100 further includes a plurality of selective couplers, illustratively a first selective coupler 162, a second selective coupler 164, a third selective coupler 166, a fourth selective coupler 168, a fifth selective coupler 170, and a sixth selective coupler 172. In the illustrated embodiment, first selective coupler 162 and second selective coupler 164 are brakes and third selective coupler 166, fourth selective coupler 168, fifth selective coupler 170, and sixth selective coupler 172 are clutches. The axial locations of the clutches and brakes relative to the plurality of planetary gearsets may be altered from the illustrated axial locations. In alternative embodiments, any number of clutches and brakes may be used.

Multi-speed transmission 100 includes several components that are illustratively shown as being fixedly coupled together. Input member 102 is fixedly coupled to third selective coupler 166, fourth selective coupler 168, and fifth selective coupler 170. Output member 104 is fixedly coupled to planet carrier 152 of fourth planetary gearset 114. Sun gear 130 of second planetary gearset 110, sun gear 140 of third planetary gearset 112, sun gear 150 of fourth planetary gearset 114, and first selective coupler 162 are fixedly coupled together. Planet carrier 132 of second planetary gearset 110, ring gear 156 of fourth planetary gearset 114, and third selective coupler 166 are fixedly coupled together. Ring gear 126 of first planetary gearset 108 and ring gear 136 of second planetary gearset 110 are fixedly coupled together. Planet carrier 122 of first planetary gearset 108, planet carrier 142 of third planetary gearset 112, and fourth selective coupler 168 are fixedly coupled together. Ring gear 146 of third planetary gearset 112, second selective coupler 164, and sixth selective coupler 172 are fixedly coupled together. Sun gear 120 of first planetary gearset 108, fifth selective coupler 170, and sixth selective coupler 172 are fixedly coupled together. In alternative embodiments, one or more of the components fixedly coupled together are selectively coupled together through one or more selective couplers.

Multi-speed transmission 100 may be described as having eight interconnectors. Input member 102 is a first interconnector that both provides input torque to multi-speed transmission 100 and fixedly couples third selective coupler 166, fourth selective coupler 168, and fifth selective coupler 170 together. Output member 104 is a second interconnector that both provides output torque from multi-speed transmission 100 and is fixedly coupled to planet carrier 152 of fourth planetary gearset 114. A third interconnector 180 fixedly couples sun gear 130 of second planetary gearset 110, sun gear 140 of third planetary gearset 112, sun gear 150 of fourth planetary gearset 114, and first selective coupler 162 together. A fourth interconnector 182 fixedly couples ring gear 156 of fourth planetary gearset 114, planet carrier 132 of second planetary gearset 110, and third selective coupler 166 together. A fifth interconnector 184 fixedly couples ring gear 126 of first planetary gearset 108 to ring gear 136 of second planetary gearset 110. A sixth interconnector 186 fixedly couples planet carrier 122 of first planetary gearset 108, planet carrier 142 of third planetary gearset 112, and fourth selective coupler 168 together. A seventh interconnector 188 fixedly couples ring gear 146 of third planetary gearset 112 to second selective coupler 164 and to sixth selective coupler 172. An eighth interconnector 190 fixedly couples sun gear 120 of first planetary gearset 108, fifth selective coupler 170, and sixth selective coupler 172 together.

Multi-speed transmission 100 further includes several components that are illustratively shown as being selectively coupled together through selective couplers. First selective coupler 162, when engaged, fixedly couples sun gear 130 of second planetary gearset 110, sun gear 140 of third planetary gearset 112, and sun gear 150 of fourth planetary gearset 114 to stationary member 106. When first selective coupler 162 is disengaged, sun gear 130 of second planetary gearset 110, sun gear 140 of third planetary gearset 112, and sun gear 150 of fourth planetary gearset 114 may rotate relative to stationary member 106.

Second selective coupler 164, when engaged, fixedly couples ring gear 146 of third planetary gearset 112 to stationary member 106. When second selective coupler 164 is disengaged, ring gear 146 of third planetary gearset 112 may rotate relative to stationary member 106.

Third selective coupler 166, when engaged, fixedly couples input member 102 to planet carrier 132 of second planetary gearset 110 and ring gear 156 of fourth planetary gearset 114. When third selective coupler 166 is disengaged, input member 102 may rotate relative to planet carrier 132 of second planetary gearset 110 and ring gear 156 of fourth planetary gearset 114.

Fourth selective coupler 168, when engaged, fixedly couples input member 102 to planet carrier 122 of first planetary gearset 108 and planet carrier 142 of third planetary gearset 112. When fourth selective coupler 168 is disengaged, input member 102 may rotate relative to planet carrier 122 of first planetary gearset 108 and planet carrier 142 of third planetary gearset 112.

Fifth selective coupler 170, when engaged, fixedly couples input member 102 to sun gear 120 of first planetary gearset 108. When fifth selective coupler 170 is disengaged, input member 102 may rotate relative to sun gear 120 of first planetary gearset 108.

Sixth selective coupler 172, when engaged, fixedly couples sun gear 120 of first planetary gearset 108 to ring gear 146 of third planetary gearset 112. When sixth selective coupler 172 is disengaged, sun gear 120 of first planetary gearset 108 may rotate relative to ring gear 146 of third planetary gearset 112.

By engaging various combinations of first selective coupler 162, second selective coupler 164, third selective coupler 166, fourth selective coupler 168, fifth selective coupler 170, and sixth selective coupler 172, additional components of multi-speed transmission 100 may be fixedly coupled together.

In the illustrated embodiment of transmission 100, input member 102 is coupled to first planetary gearset 108, second planetary gearset 110, third planetary gearset 112, and fourth planetary gearset 114 only through third selective coupler 166, fourth selective coupler 168, and fifth selective coupler 170. Third selective coupler 166, when engaged, fixedly couples input member 102 to a first group of the plurality of planetary gearsets, illustratively second planetary gearset 110 and fourth planetary gearset 114. Fourth selective coupler 168, when engaged, fixedly couples input member 102 to a second group of the plurality of planetary gearsets, illustratively first planetary gearset 108 and third planetary gearset 112. Fifth selective coupler 170, when engaged, fixedly couples input member 102 to a third group of the plurality of planetary gearsets, illustratively first planetary gearset 108. Each of the first group of the plurality of planetary gearsets, the second group of the plurality of planetary gearsets, and the third group of the plurality of planetary gearsets, may include a single planetary gearset or a plurality of planetary gearsets. Further, each of first planetary gearset 108, second planetary gearset 110, third planetary gearset 112, and fourth planetary gearset 114 may be included in more than one of the first group of the plurality of planetary gearsets, the second group of the plurality of planetary gearsets, and the third group of the plurality of planetary gearsets.

The plurality of planetary gearsets and the plurality of selective couplers of multi-speed transmission 100 may be interconnected in various arrangements to provide torque from input member 102 to output member 104 in at least nine forward gear or speed ratios and one reverse gear or speed ratio. Referring to FIG. 2, an exemplary truth table 200 is shown that provides the state of each of first selective coupler 162, second selective coupler 164, third selective coupler 166, fourth selective coupler 168, fifth selective coupler 170, and sixth selective coupler 172 for ten different forward gear or speed ratios and one reverse gear or speed ratio. Each row corresponds to a given interconnection arrangement for transmission 100. The first column provides the gear range (reverse and $1^{st}$-$10^{th}$ forward gears). The second column provides the gear ratio between the input member 102 and the output member 104. The third column provides the gear step. The six rightmost columns illustrate which ones of the selective couplers 162-172 are engaged ("1" indicates engaged) and which ones of selective couplers 162-172 are disengaged ("(blank)" indicates disengaged). FIG. 2 is only one example of any number of truth tables possible for achieving at least nine forward ratios and one reverse ratio.

In the example of FIG. 2, the illustrated reverse ratio (Rev) is achieved by having first selective coupler 162, second selective coupler 164, and fifth selective coupler 170 in an engaged configuration and third selective coupler 166, fourth selective coupler 168, and sixth selective coupler 172 in a disengaged configuration.

In one embodiment, to place multi-speed transmission 100 in neutral (Neu), all of first selective coupler 162, second selective coupler 164, third selective coupler 166, fourth selective coupler 168, fifth selective coupler 170, and sixth selective coupler 172 are in the disengaged configuration. One or more of first selective coupler 162, second selective coupler 164, third selective coupler 166, fourth selective coupler 168, fifth selective coupler 170, and sixth selective coupler 172 may remain engaged in neutral (Neu) as long as the combination of first selective coupler 162, second selective coupler 164, third selective coupler 166, fourth selective coupler 168, fifth selective coupler 170, and sixth selective coupler 172 does not transmit torque from input member 102 to output member 104.

A first forward ratio (shown as 1st) in truth table 200 of FIG. 2 is achieved by having first selective coupler 162, fifth selective coupler 170, and sixth selective coupler 172 in an engaged configuration and second selective coupler 164, third selective coupler 166, and fourth selective coupler 168 in a disengaged configuration.

A second or subsequent forward ratio (shown as 2nd) in truth table 200 of FIG. 2 is achieved by having first selective coupler 162, fourth selective coupler 168, and sixth selective coupler 172 in an engaged configuration and second selective coupler 164, third selective coupler 166, and fifth selective coupler 170 in a disengaged configuration. Therefore, when transitioning between the first forward ratio and the second forward ratio, fifth selective coupler 170 is placed in the disengaged configuration and fourth selective coupler 168 is placed in the engaged configuration.

A third or subsequent forward ratio (shown as 3rd) in truth table 200 of FIG. 2 is achieved by having first selective coupler 162, fourth selective coupler 168, and fifth selective coupler 170 in an engaged configuration and second selective coupler 164, third selective coupler 166, and sixth selective coupler 172 in a disengaged configuration. Therefore, when transitioning between the second forward ratio and the third forward ratio, sixth selective coupler 172 is placed in the disengaged configuration and fifth selective coupler 170 is placed in the engaged configuration.

A fourth or subsequent forward ratio (shown as 4th) in truth table 200 of FIG. 2 is achieved by having first selective coupler 162, third selective coupler 166, and fourth selective coupler 168 in an engaged configuration and second selective coupler 164, fifth selective coupler 170, and sixth selective coupler 172 in a disengaged configuration. Therefore, when transitioning between the third forward ratio and the fourth forward ratio, fifth selective coupler 170 is placed in the disengaged configuration and third selective coupler 166 is placed in the engaged configuration.

A fifth or subsequent forward ratio (shown as 5th) in truth table 200 of FIG. 2 is achieved by having third selective coupler 166, fourth selective coupler 168, and sixth selective coupler 172 in an engaged configuration and first selective coupler 162, second selective coupler 164, and fifth selective coupler 170 in a disengaged configuration. Therefore, when transitioning between the fourth forward ratio and the fifth forward ratio, first selective coupler 162 is placed in the disengaged configuration and sixth selective coupler 172 is placed in the engaged configuration.

A sixth or subsequent forward ratio (shown as 6th) in truth table 200 of FIG. 2 is achieved by having second selective coupler 164, third selective coupler 166, and sixth selective coupler 172 in an engaged configuration and first selective coupler 162, fourth selective coupler 168, and fifth selective coupler 170 in a disengaged configuration. Therefore, when transitioning between the fifth forward ratio and the sixth forward ratio, fourth selective coupler 168 is placed in the disengaged configuration and second selective coupler 164 is placed in the engaged configuration.

A seventh or subsequent forward ratio (shown as 7th) in truth table 200 of FIG. 2 is achieved by having second selective coupler 164, third selective coupler 166, and fifth selective coupler 170 in an engaged configuration and first selective coupler 162, fourth selective coupler 168, and sixth selective coupler 172 in a disengaged configuration. Therefore, when transitioning between the sixth forward ratio and the seventh forward ratio, sixth selective coupler 172 is placed in the disengaged configuration and fifth selective coupler 170 is placed in the engaged configuration.

An eighth or subsequent forward ratio (shown as 8th) in truth table 200 of FIG. 2 is achieved by having second selective coupler 164, third selective coupler 166, and fourth selective coupler 168 in an engaged configuration and first selective coupler 162, fifth selective coupler 170, and sixth selective coupler 172 in a disengaged configuration. Therefore, when transitioning between the seventh forward ratio and the eighth forward ratio, fifth selective coupler 170 is placed in the disengaged configuration and fourth selective coupler 168 is placed in the engaged configuration.

A ninth or subsequent forward ratio (shown as 9th) in truth table 200 of FIG. 2 is achieved by having second selective coupler 164, fourth selective coupler 168, and fifth selective coupler 170 in an engaged configuration and first selective coupler 162, third selective coupler 166, and sixth selective coupler 172 in a disengaged configuration. Therefore, when transitioning between the eighth forward ratio and the ninth forward ratio, third selective coupler 166 is placed in the disengaged configuration and fifth selective coupler 170 is placed in the engaged configuration.

A tenth or subsequent forward ratio (shown as 10th) in truth table 200 of FIG. 2 is achieved by having second selective coupler 164, fourth selective coupler 168, and sixth selective coupler 172 in an engaged configuration and first selective coupler 162, third selective coupler 166, and fifth selective coupler 170 in a disengaged configuration. Therefore, when transitioning between the ninth forward ratio and the tenth forward ratio, fifth selective coupler 170 is placed in the disengaged configuration and sixth selective coupler 172 is placed in the engaged configuration.

Figure 3:
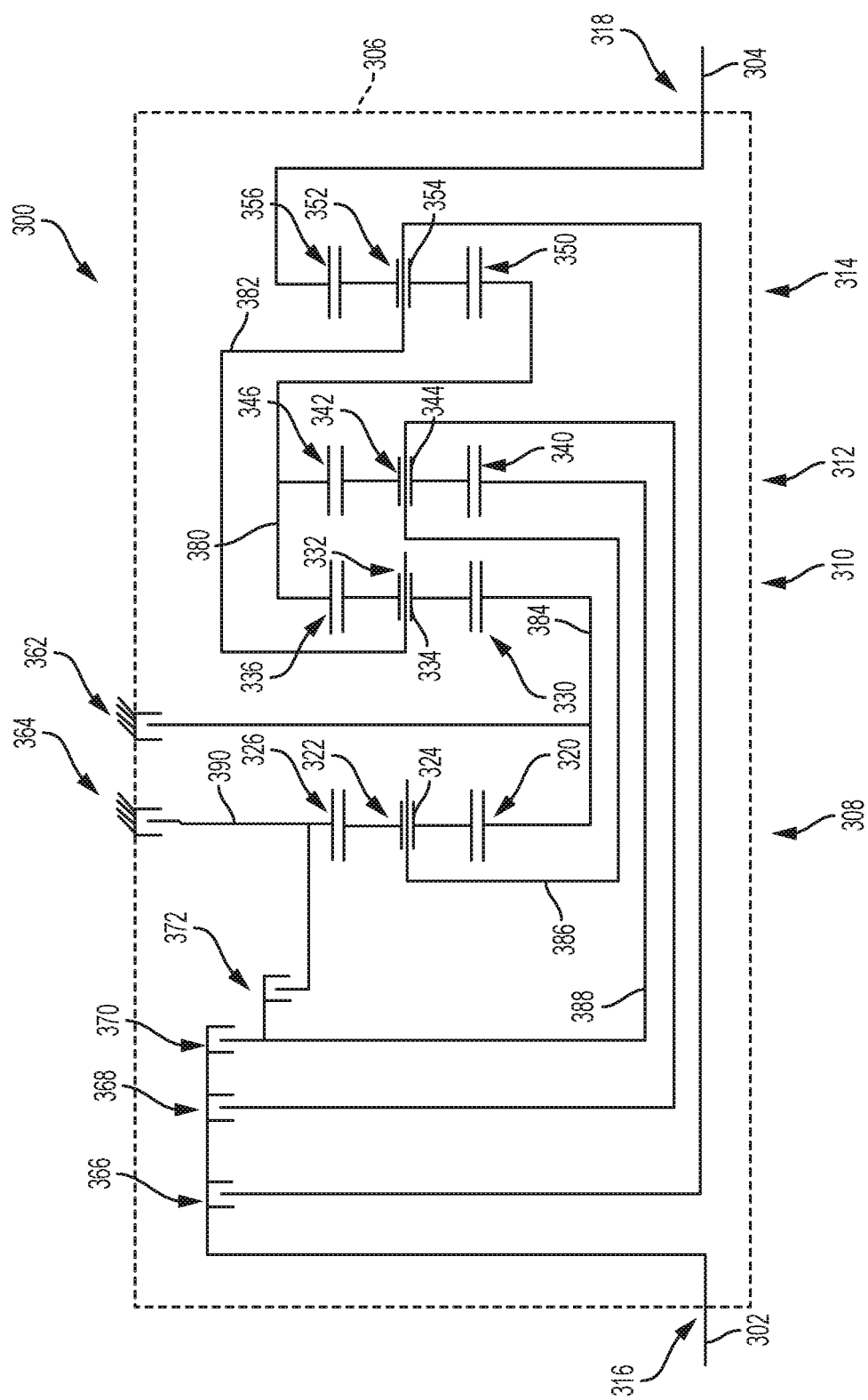
FIG. 3 is a diagrammatic view of a second exemplary multi-speed transmission including four planetary gearsets and six selective couplers.

FIG. 3 is a diagrammatic representation of a multi-speed transmission 300. Multi-speed transmission 300 includes an input member 302 and an output member 304. Each of input member 302 and output member 304 is rotatable relative to at least one stationary member 306. An exemplary input member 302 is an input shaft or other suitable rotatable component. An exemplary output member 304 is an output shaft or other suitable rotatable component. An exemplary stationary member 306 is a housing of multi-speed transmission 300. The housing may include several components coupled together.

Multi-speed transmission 300 includes a plurality of planetary gearsets, illustratively a first planetary gearset 308, a second planetary gearset 310, a third planetary gearset 312, and a fourth planetary gearset 314. In one embodiment, additional planetary gearsets may be included. Further, although first planetary gearset 308, second planetary gearset 310, third planetary gearset 312, and fourth planetary gearset 314 are illustrated as simple planetary gearsets, it is contemplated that compound planetary gearsets may be included in some embodiments.

In one embodiment, multi-speed transmission 300 is arranged as illustrated in FIG. 3, with first planetary gearset 308 positioned between a first location or end 316 at which input member 302 enters stationary member 306 and second planetary gearset 310, second planetary gearset 310 is positioned between first planetary gearset 308 and third planetary gearset 312, third planetary gearset 312 is positioned between second planetary gearset 310 and fourth planetary gearset 314, and fourth planetary gearset 314 is positioned between third planetary gearset 312 and a second location or end 318 at which output member 304 exits stationary member 306. In alternative embodiments, first planetary gearset 308, second planetary gearset 310, third planetary gearset 312, and fourth planetary gearset 314 are arranged in any order relative to location 316 and location 318. In the illustrated embodiment of FIG. 3, each of first planetary gearset 308, second planetary gearset 310, third planetary gearset 312, and fourth planetary gearset 314 are axially aligned. In one example, input member 302 and output member 304 are also axially aligned with first planetary gearset 308, second planetary gearset 310, third planetary gearset 312, and fourth planetary gearset 314. In alternative embodiments, one or more of input member 302, output member 304, first planetary gearset 308, second planetary gearset 310, third planetary gearset 312, and fourth planetary gearset 314 are offset and not axially aligned with the remainder.

First planetary gearset 308 includes a sun gear 320, a planet carrier 322 supporting a plurality of planet gears 324, and a ring gear 326. Second planetary gearset 310 includes a sun gear 330, a planet carrier 332 supporting a plurality of planet gears 334, and a ring gear 336. Third planetary gearset 312 includes a sun gear 340, a planet carrier 342 supporting a plurality of planet gears 344, and a ring gear 346. Fourth planetary gearset 314 includes a sun gear 350, a planet carrier 352 supporting a plurality of planet gears 354, and a ring gear 356.

Multi-speed transmission 300 further includes a plurality of selective couplers, illustratively a first selective coupler 362, a second selective coupler 364, a third selective coupler 366, a fourth selective coupler 368, a fifth selective coupler 370, and a sixth selective coupler 372. In the illustrated embodiment, first selective coupler 362 and second selective coupler 364 are brakes and third selective coupler 366, fourth selective coupler 368, fifth selective coupler 370, and sixth selective coupler 372 are clutches. The axial locations of the clutches and brakes relative to the plurality of planetary gearsets may be altered from the illustrated axial locations. In alternative embodiments, any number of clutches and brakes may be used.

Multi-speed transmission 300 includes several components that are illustratively shown as being fixedly coupled together. Input member 302 is fixedly coupled to third selective coupler 366, fourth selective coupler 368, and fifth selective coupler 370. Output member 304 is fixedly coupled to ring gear 356 of fourth planetary gearset 314. Ring gear 336 of second planetary gearset 310, ring gear 346 of third planetary gearset 312, and sun gear 350 of fourth planetary gearset 314 are fixedly coupled together. Planet carrier 332 of second planetary gearset 310, planet carrier 352 of fourth planetary gearset 314, and third selective coupler 366 are fixedly coupled together. Sun gear 320 of first planetary gearset 308, sun gear 330 of second planetary gearset 310, and first selective coupler 362 are fixedly coupled together. Planet carrier 322 of first planetary gearset 308, planet carrier 342 of third planetary gearset 312, and fourth selective coupler 368 are fixedly coupled together. Sun gear 340 of third planetary gearset 312, fifth selective coupler 370, and sixth selective coupler 372 are fixedly coupled together. Ring gear 326 of first planetary gearset 308, second selective coupler 364, and sixth selective coupler 372 are fixedly coupled together. In alternative embodiments, one or more of the components fixedly coupled together are selectively coupled together through one or more selective couplers.

Multi-speed transmission 300 may be described as having eight interconnectors. Input member 302 is a first interconnector that both provides input torque to multi-speed transmission 300 and is fixedly coupled to third selective coupler 366, fourth selective coupler 368, and fifth selective coupler 370. Output member 304 is a second interconnector that provides output torque from multi-speed transmission 300 and is fixedly coupled to ring gear 356 of fourth planetary gearset 314. A third interconnector 380 fixedly couples ring gear 336 of second planetary gearset 310, ring gear 346 of third planetary gearset 312, and sun gear 350 of fourth planetary gearset 314 together. A fourth interconnector 382 fixedly couples planet carrier 332 of second planetary gearset 310, planet carrier 352 of fourth planetary gearset 314, and third selective coupler 366 together. A fifth interconnector 384 fixedly couples sun gear 320 of first planetary gearset 308, sun gear 330 of second planetary gearset 310, and first selective coupler 362 together. A sixth interconnector 386 fixedly couples planet carrier 322 of first planetary gearset 308, planet carrier 342 of third planetary gearset 312, and fourth selective coupler 368 together. A seventh interconnector 388 fixedly couples sun gear 340 of third planetary gearset 312, fifth selective coupler 370, and sixth selective coupler 372 together. An eighth interconnector 390 fixedly couples ring gear 326 of first planetary gearset 308, second selective coupler 364, and sixth selective coupler 372 together.

Multi-speed transmission 300 further includes several components that are illustratively shown as being selectively coupled together through selective couplers. First selective coupler 362, when engaged, fixedly couples sun gear 320 of first planetary gearset 308 and sun gear 330 of second planetary gearset 310 to stationary member 306. When first selective coupler 362 is disengaged, sun gear 320 of first planetary gearset 308 and sun gear 330 of second planetary gearset 310 may rotate relative to stationary member 306.

Second selective coupler 364, when engaged, fixedly couples ring gear 326 of first planetary gearset 308 to stationary member 306. When second selective coupler 364 is disengaged, ring gear 326 of first planetary gearset 308 may rotate relative to stationary member 306.

Third selective coupler 366, when engaged, fixedly couples input member 302 to planet carrier 332 of second planetary gearset 310 and planet carrier 352 of fourth planetary gearset 314. When third selective coupler 366 is disengaged, input member 302 may rotate relative to planet carrier 332 of second planetary gearset 310 and planet carrier 352 of fourth planetary gearset 314.

Fourth selective coupler 368, when engaged, fixedly couples input member 302 to planet carrier 322 of first planetary gearset 308 and planet carrier 342 of third planetary gearset 312. When fourth selective coupler 368 is disengaged, input member 302 may rotate relative to planet carrier 322 of first planetary gearset 308 and planet carrier 342 of third planetary gearset 312.

Fifth selective coupler 370, when engaged, fixedly couples input member 302 to sun gear 340 of third planetary gearset 312. When fifth selective coupler 370 is disengaged, input member 302 may rotate relative to sun gear 340 of third planetary gearset 312.

Sixth selective coupler 372, when engaged, fixedly couples ring gear 326 of first planetary gearset 308 to sun gear 340 of third planetary gearset 312. When sixth selective coupler 372 is disengaged, ring gear 326 of first planetary gearset 308 may rotate relative to sun gear 340 of third planetary gearset 312.

By engaging various combinations of first selective coupler 362, second selective coupler 364, third selective coupler 366, fourth selective coupler 368, fifth selective coupler 370, and sixth selective coupler 372, additional components of multi-speed transmission 300 may be fixedly coupled together.

In the illustrated embodiment of transmission 300, input member 302 is coupled to first planetary gearset 308, second planetary gearset 310, third planetary gearset 312, and fourth planetary gearset 314 only through third selective coupler 366, fourth selective coupler 368, and fifth selective coupler 370. Third selective coupler 366, when engaged, fixedly couples input member 302 to a first group of the plurality of planetary gearsets, illustratively second planetary gearset 310 and fourth planetary gearset 314. Fourth selective coupler 368, when engaged, fixedly couples input member 302 to a second group of the plurality of planetary gearsets, illustratively first planetary gearset 308 and third planetary gearset 312. Fifth selective coupler 170, when engaged, fixedly couples input member 102 to a third group of the plurality of planetary gearsets, illustratively third planetary gearset 312. Each of the first group of the plurality of planetary gearsets, the second group of the plurality of planetary gearsets, and the third group of the plurality of planetary gearsets, may include a single planetary gearset or a plurality of planetary gearsets. Further, each of first planetary gearset 308, second planetary gearset 310, third planetary gearset 312, and fourth planetary gearset 314 may be included in more than one of the first group of the plurality of planetary gearsets, the second group of the plurality of planetary gearsets, and the third group of the plurality of planetary gearsets.

The plurality of planetary gearsets and the plurality of selective couplers of multi-speed transmission 300 may be interconnected in various arrangements to provide torque from input member 302 to output member 304 in at least nine forward gear or speed ratios and one reverse gear or speed ratio. Referring to FIG. 4, an exemplary truth table 400 is shown that provides the state of each of first selective coupler 362, second selective coupler 364, third selective coupler 366, fourth selective coupler 368, fifth selective coupler 370, and sixth selective coupler 372 for ten different forward gear or speed ratios and one reverse gear or speed ratio. Each row corresponds to a given interconnection arrangement for transmission 300. The first column provides the gear range (reverse and $1^{st}$-$10^{th}$ forward gears). The second column provides the gear ratio between the input member 302 and the output member 304. The third column provides the gear step. The six rightmost columns illustrate which ones of the selective couplers 362-372 are engaged ("1" indicates engaged) and which ones of selective couplers 362-372 are disengaged ("(blank)" indicates disengaged).

FIG. 4 is only one example of any number of truth tables possible for achieving at least nine forward ratios and one reverse ratio.

In the example of FIG. 4, the illustrated reverse ratio (Rev) is achieved by having first selective coupler 362, second selective coupler 364, and fifth selective coupler 370 in an engaged configuration and third selective coupler 366, fourth selective coupler 368, and sixth selective coupler 372 in a disengaged configuration.

In one embodiment, to place multi-speed transmission 300 in neutral (Neu), all of first selective coupler 362, second selective coupler 364, third selective coupler 366, fourth selective coupler 368, fifth selective coupler 370, and sixth selective coupler 372 are in the disengaged configuration. One or more of first selective coupler 362, second selective coupler 364, third selective coupler 366, fourth selective coupler 368, fifth selective coupler 370, and sixth selective coupler 372 may remain engaged in neutral (Neu) as long as the combination of first selective coupler 362, second selective coupler 364, third selective coupler 366, fourth selective coupler 368, fifth selective coupler 370, and sixth selective coupler 372 does not transmit torque from input member 302 to output member 304.

A first forward ratio (shown as 1st) in truth table 400 of FIG. 4 is achieved by having first selective coupler 362, fifth selective coupler 370, and sixth selective coupler 372 in an engaged configuration and second selective coupler 364, third selective coupler 366, and fourth selective coupler 368 in a disengaged configuration.

A second or subsequent forward ratio (shown as 2nd) in truth table 400 of FIG. 4 is achieved by having first selective coupler 362, fourth selective coupler 368, and sixth selective coupler 372 in an engaged configuration and second selective coupler 364, third selective coupler 366, and fifth selective coupler 370 in a disengaged configuration. Therefore, when transitioning between the first forward ratio and the second forward ratio, fifth selective coupler 370 is placed in the disengaged configuration and fourth selective coupler 368 is placed in the engaged configuration.

A third or subsequent forward ratio (shown as 3rd) in truth table 400 of FIG. 4 is achieved by having first selective coupler 362, fourth selective coupler 368, and fifth selective coupler 370 in an engaged configuration and second selective coupler 364, third selective coupler 366, and sixth selective coupler 372 in a disengaged configuration. Therefore, when transitioning between the second forward ratio and the third forward ratio, sixth selective coupler 372 is placed in the disengaged configuration and fifth selective coupler 370 is placed in the engaged configuration.

A fourth or subsequent forward ratio (shown as 4th) in truth table 400 of FIG. 4 is achieved by having first selective coupler 362, third selective coupler 366, and fourth selective coupler 368 in an engaged configuration and second selective coupler 364, fifth selective coupler 370, and sixth selective coupler 372 in a disengaged configuration. Therefore, when transitioning between the third forward ratio and the fourth forward ratio, fifth selective coupler 370 is placed in the disengaged configuration and third selective coupler 366 is placed in the engaged configuration.

A fifth or subsequent forward ratio (shown as 5th) in truth table 400 of FIG. 4 is achieved by having third selective coupler 366, fourth selective coupler 368, and sixth selective coupler 372 in an engaged configuration and first selective coupler 362, second selective coupler 364, and fifth selective coupler 370 in a disengaged configuration. Therefore, when transitioning between the fourth forward ratio and the fifth forward ratio, first selective coupler 362 is placed in the disengaged configuration and sixth selective coupler 372 is placed in the engaged configuration.

A sixth or subsequent forward ratio (shown as 6th) in truth table 400 of FIG. 4 is achieved by having second selective coupler 364, third selective coupler 366, and sixth selective coupler 372 in an engaged configuration and first selective coupler 362, fourth selective coupler 368, and fifth selective coupler 370 in a disengaged configuration. Therefore, when transitioning between the fifth forward ratio and the sixth forward ratio, fourth selective coupler 368 is placed in the disengaged configuration and second selective coupler 364 is placed in the engaged configuration.

A seventh or subsequent forward ratio (shown as 7th) in truth table 400 of FIG. 4 is achieved by having second selective coupler 364, third selective coupler 366, and fifth selective coupler 370 in an engaged configuration and first selective coupler 362, fourth selective coupler 368, and sixth selective coupler 372 in a disengaged configuration. Therefore, when transitioning between the sixth forward ratio and the seventh forward ratio, sixth selective coupler 372 is placed in the disengaged configuration and fifth selective coupler 370 is placed in the engaged configuration.

An eighth or subsequent forward ratio (shown as 8th) in truth table 400 of FIG. 4 is achieved by having second selective coupler 364, third selective coupler 366, fourth selective coupler 368 in an engaged configuration and first selective coupler 362, fifth selective coupler 370, and sixth selective coupler 372 in a disengaged configuration. Therefore, when transitioning between the seventh forward ratio and the eighth forward ratio, fifth selective coupler 370 is placed in the disengaged configuration and fourth selective coupler 368 is placed in the engaged configuration.

A ninth or subsequent forward ratio (shown as 9th) in truth table 400 of FIG. 4 is achieved by having second selective coupler 364, fourth selective coupler 368, and fifth selective coupler 370 in an engaged configuration and first selective coupler 362, third selective coupler 366, and sixth selective coupler 372 in a disengaged configuration. Therefore, when transitioning between the eighth forward ratio and the ninth forward ratio, third selective coupler 366 is placed in the disengaged configuration and fifth selective coupler 370 is placed in the engaged configuration.

A tenth or subsequent forward ratio (shown as 10th) in truth table 400 of FIG. 4 is achieved by having second selective coupler 364, fourth selective coupler 368, and sixth selective coupler 372 in an engaged configuration and first selective coupler 362, third selective coupler 366, and fifth selective coupler 370 in a disengaged configuration. Therefore, when transitioning between the ninth forward ratio and the tenth forward ratio, fifth selective coupler 370 is placed in the disengaged configuration and sixth selective coupler 372 is placed in the engaged configuration.

Figure 5:
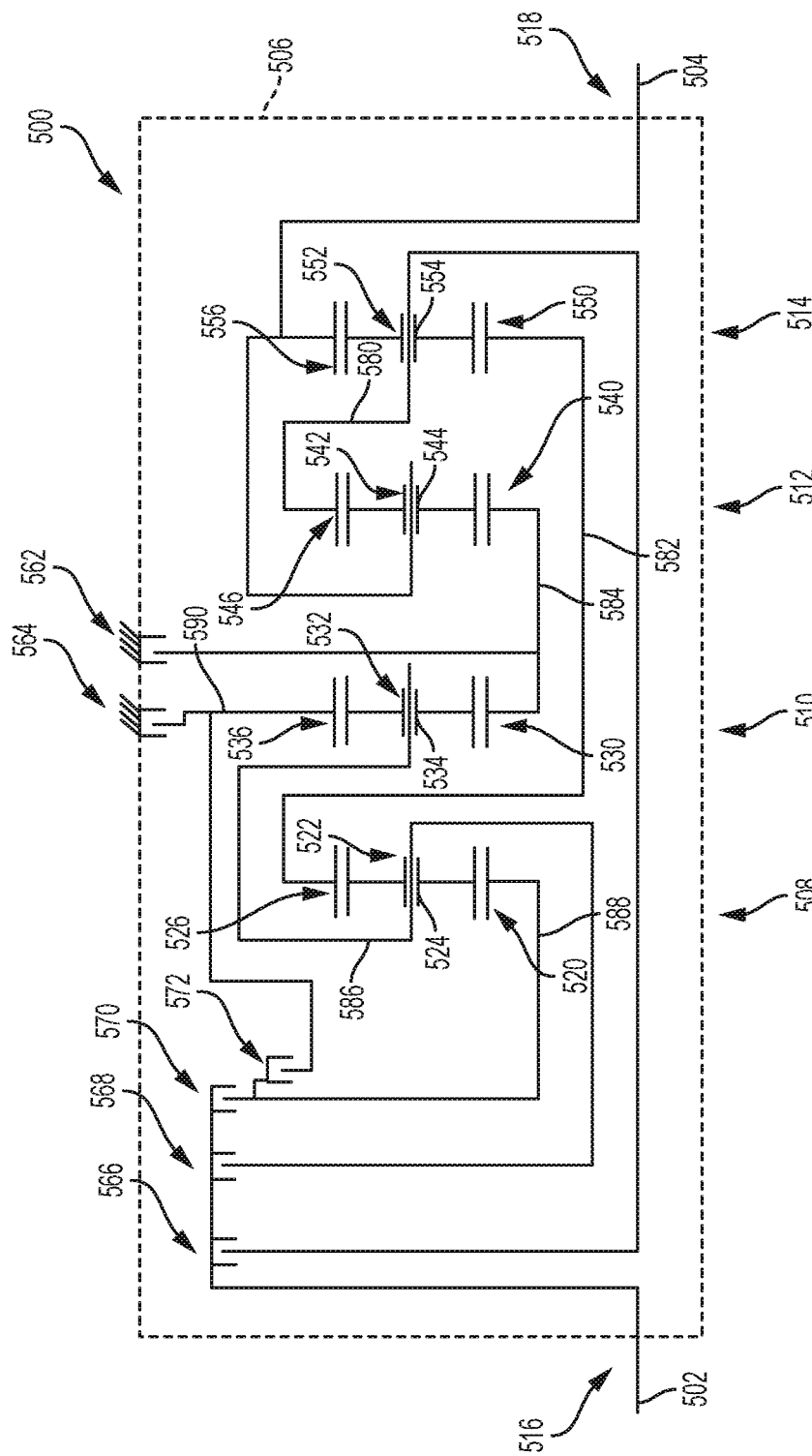
FIG. 5 is a diagrammatic view of a third exemplary multi-speed transmission including four planetary gearsets and six selective couplers.

FIG. 5 is a diagrammatic representation of a multi-speed transmission 500. Multi-speed transmission 500 includes an input member 502 and an output member 504. Each of input member 502 and output member 504 is rotatable relative to at least one stationary member 506. An exemplary input member 502 is an input shaft or other suitable rotatable component. An exemplary output member 504 is an output shaft or other suitable rotatable component. An exemplary stationary member 506 is a housing of multi-speed transmission 500. The housing may include several components coupled together.

Multi-speed transmission 500 includes a plurality of planetary gearsets, illustratively a first planetary gearset 508, a second planetary gearset 510, a third planetary gearset 512, and a fourth planetary gearset 514. In one embodiment, additional planetary gearsets may be included. Further, although first planetary gearset 508, second planetary gearset 510, third planetary gearset 512, and fourth planetary gearset 514 are illustrated as simple planetary gearsets, it is contemplated that compound planetary gearsets may be included in some embodiments.

In one embodiment, multi-speed transmission 500 is arranged as illustrated in FIG. 5, with first planetary gearset 508 positioned between a first location or end 516 at which input member 502 enters stationary member 506 and second planetary gearset 510, second planetary gearset 510 is positioned between first planetary gearset 508 and third planetary gearset 512, third planetary gearset 512 is positioned between second planetary gearset 510 and fourth planetary gearset 514, and fourth planetary gearset 514 is positioned between third planetary gearset 512 and a second location or end 518 at which output member 504 exits stationary member 506. In alternative embodiments, first planetary gearset 508, second planetary gearset 510, third planetary gearset 512, and fourth planetary gearset 514 are arranged in any order relative to location 516 and location 518. In the illustrated embodiment of FIG. 5, each of first planetary gearset 508, second planetary gearset 510, third planetary gearset 512, and fourth planetary gearset 514 are axially aligned. In one example, input member 502 and output member 504 are also axially aligned with first planetary gearset 508, second planetary gearset 510, third planetary gearset 512, and fourth planetary gearset 514. In alternative embodiments, one or more of input member 502, output member 504, first planetary gearset 508, second planetary gearset 510, third planetary gearset 512, and fourth planetary gearset 514 are offset and not axially aligned with the remainder.

First planetary gearset 508 includes a sun gear 520, a planet carrier 522 supporting a plurality of planet gears 524, and a ring gear 526. Second planetary gearset 510 includes a sun gear 530, a planet carrier 532 supporting a plurality of planet gears 534, and a ring gear 536. Third planetary gearset 512 includes a sun gear 540, a planet carrier 542 supporting a plurality of planet gears 544, and a ring gear 546. Fourth planetary gearset 514 includes a sun gear 550, a planet carrier 552 supporting a plurality of planet gears 554, and a ring gear 556.

Multi-speed transmission 500 further includes a plurality of selective couplers, illustratively a first selective coupler 562, a second selective coupler 564, a third selective coupler 566, a fourth selective coupler 568, a fifth selective coupler 570, and a sixth selective coupler 572. In the illustrated embodiment, first selective coupler 562 and second selective coupler 564 are brakes and third selective coupler 566, fourth selective coupler 568, fifth selective coupler 570, and sixth selective coupler 572 are clutches. The axial locations of the clutches and brakes relative to the plurality of planetary gearsets may be altered from the illustrated axial locations. In alternative embodiments, any number of clutches and brakes may be used.

Multi-speed transmission 500 includes several components that are illustratively shown as being fixedly coupled together. Input member 502 is fixedly coupled to third selective coupler 566, fourth selective coupler 568, and fifth selective coupler 570. Output member 504 is fixedly coupled to planet carrier 542 of third planetary gearset 512 and ring gear 556 of fourth planetary gearset 514. Planet carrier 522 of first planetary gearset 508, planet carrier 532 of second planetary gearset 510, and fourth selective coupler 568 are fixedly coupled together. Sun gear 530 of second planetary gearset 510, sun gear 540 of third planetary gearset 512, and first selective coupler 562 are fixedly coupled together. Ring gear 546 of third planetary gearset 512, planet carrier 552 of fourth planetary gearset 514, and third selective coupler 566 are fixedly coupled together. Ring gear 526 of first planetary gearset 508 and sun gear 550 of fourth planetary gearset 514 are fixedly coupled together. Ring gear 536 of second planetary gearset 510, second selective coupler 564, and sixth selective coupler 572 are fixedly coupled together. Sun gear 520 of first planetary gearset 508, fifth selective coupler 570, and sixth selective coupler 572 are fixedly coupled together. In alternative embodiments, one or more of the components fixedly coupled together are selectively coupled together through one or more selective couplers.

Multi-speed transmission 500 may be described as having eight interconnectors. Input member 502 is a first interconnector that both provides input torque to multi-speed transmission 500 and fixedly couples third selective coupler 566, fourth selective coupler 568, and fifth selective coupler 570 together. Output member 504 is a second interconnector that provides output torque from multi-speed transmission 500 and fixedly couples ring gear 556 of fourth planetary gearset 514 to planet carrier 542 of third planetary gearset 512. A third interconnector 580 fixedly couples ring gear 546 of third planetary gearset 512, planet carrier 552 of fourth planetary gearset 514, third selective coupler 566 together. A fourth interconnector 582 fixedly couples ring gear 526 of first planetary gearset 508 to sun gear 550 of fourth planetary gearset 514. A fifth interconnector 584 fixedly couples sun gear 530 of second planetary gearset 510, sun gear 540 of third planetary gearset 512, and first selective coupler 562 together. A sixth interconnector 586 fixedly couples planet carrier 532 of second planetary gearset 510, planet carrier 522 of first planetary gearset 508, and fourth selective coupler 568 together. A seventh interconnector 588 fixedly couples sun gear 520 of first planetary gearset 508, fifth selective coupler 570, and sixth selective coupler 572 together. An eighth interconnector 590 fixedly couples ring gear 536 of second planetary gearset 510, second selective coupler 564, and sixth selective coupler 572 together.

Multi-speed transmission 500 further includes several components that are illustratively shown as being selectively coupled together through selective couplers. First selective coupler 562, when engaged, fixedly couples sun gear 530 of second planetary gearset 510 and sun gear 540 of third planetary gearset 512 to stationary member 506. When first selective coupler 562 is disengaged, sun gear 530 of second planetary gearset 510 and sun gear 540 of third planetary gearset 512 may rotate relative to stationary member 506.

Second selective coupler 564, when engaged, fixedly couples ring gear 536 of second planetary gearset 510 to stationary member 506. When second selective coupler 564 is disengaged, ring gear 536 of second planetary gearset 510 may rotate relative to stationary member 506.

Third selective coupler 566, when engaged, fixedly couples input member 502 to planet carrier 552 of fourth planetary gearset 514 and ring gear 546 of third planetary gearset 512. When third selective coupler 566 is disengaged, planet carrier 552 of fourth planetary gearset 514 and ring gear 546 of third planetary gearset 512 may rotate relative to input member 502.

Fourth selective coupler 568, when engaged, fixedly couples input member 502 to planet carrier 522 of first planetary gearset 508 and planet carrier 532 of second planetary gearset 510. When fourth selective coupler 568 is disengaged, planet carrier 522 of first planetary gearset 508 and planet carrier 532 of second planetary gearset 510 may rotate relative to input member 502.

Fifth selective coupler 570, when engaged, fixedly couples input member 502 to sun gear 520 of first planetary gearset 508. When fifth selective coupler 570 is disengaged, sun gear 520 of first planetary gearset 508 may rotate relative to input member 502.

Sixth selective coupler 572, when engaged, fixedly couples ring gear 536 of second planetary gearset 510 to sun gear 520 of first planetary gearset 508. When sixth selective coupler 572 is disengaged, ring gear 536 of second planetary gearset 510 may rotate relative to sun gear 520 of first planetary gearset 508.

By engaging various combinations of first selective coupler 562, second selective coupler 564, third selective coupler 566, fourth selective coupler 568, fifth selective coupler 570, and sixth selective coupler 572, additional components of multi-speed transmission 500 may be fixedly coupled together.

In the illustrated embodiment of transmission 500, input member 502 is coupled to first planetary gearset 508, second planetary gearset 510, third planetary gearset 512, and fourth planetary gearset 514 only through third selective coupler 566, fourth selective coupler 568, and fifth selective coupler 570. Third selective coupler 566, when engaged, fixedly couples input member 502 to a first group of the plurality of planetary gearsets, illustratively third planetary gearset 512 and fourth planetary gearset 514. Fourth selective coupler 568, when engaged, fixedly couples input member 502 to a second group of the plurality of planetary gearsets, illustratively first planetary gearset 508 and second planetary gearset 510. Fifth selective coupler 570, when engaged, fixedly couples input member 502 to a third group of the plurality of planetary gearsets, illustratively first planetary gearset 508. Each of the first group of the plurality of planetary gearsets, the second group of the plurality of planetary gearsets, and the third group of the plurality of planetary gearsets, may include a single planetary gearset or a plurality of planetary gearsets. Further, each of first planetary gearset 508, second planetary gearset 510, third planetary gearset 512, and fourth planetary gearset 514 may be included in more than one of the first group of the plurality of planetary gearsets, the second group of the plurality of planetary gearsets, and the third group of the plurality of planetary gearsets.

The plurality of planetary gearsets and the plurality of selective couplers of multi-speed transmission 500 may be interconnected in various arrangements to provide torque from input member 502 to output member 504 in at least nine forward gear or speed ratios, illustratively ten, and one reverse gear or speed ratio. Referring to FIG. 6, an exemplary truth table 600 is shown that provides the state of each of first selective coupler 562, second selective coupler 564, third selective coupler 566, fourth selective coupler 568, fifth selective coupler 570, and sixth selective coupler 572 for ten different forward gear or speed ratios and one reverse gear or speed ratio. Each row corresponds to a given interconnection arrangement for transmission 500. The first column provides the gear range (reverse and $1^{st}$-$10^{th}$ forward gears). The second column provides the gear ratio between the input member 502 and the output member 504. The third column provides the gear step. The six rightmost columns illustrate which ones of the selective couplers 562-572 are engaged ("1" indicates engaged) and which ones of selective couplers 562-572 are disengaged ("(blank)" indicates disengaged). FIG. 6 is only one example of any number of truth tables possible for achieving at least nine forward ratios and one reverse ratio.

In the example of FIG. 6, the illustrated reverse ratio (Rev) is achieved by having first selective coupler 562, second selective coupler 564, and fifth selective coupler 570 in an engaged configuration and third selective coupler 566, fourth selective coupler 568, and sixth selective coupler 572 in a disengaged configuration.

In one embodiment, to place multi-speed transmission 500 in neutral (Neu), all of first selective coupler 562, second selective coupler 564, third selective coupler 566, fourth selective coupler 568, fifth selective coupler 570, and sixth selective coupler 572 are in the disengaged configuration. One or more of first selective coupler 562, second selective coupler 564, third selective coupler 566, fourth selective coupler 568, fifth selective coupler 570, and sixth selective coupler 572 may remain engaged in neutral (Neu) as long as the combination of first selective coupler 562, second selective coupler 564, third selective coupler 566, fourth selective coupler 568, fifth selective coupler 570, and sixth selective coupler 572 does not transmit torque from input member 502 to output member 504.

A first forward ratio (shown as 1st) in truth table 600 of FIG. 6 is achieved by having first selective coupler 562, fifth selective coupler 570, and sixth selective coupler 572 in an engaged configuration and second selective coupler 564, third selective coupler 566, fourth selective coupler 568 in a disengaged configuration.

A second or subsequent forward ratio (shown as 2nd) in truth table 600 of FIG. 6 is achieved by having first selective coupler 562, fourth selective coupler 568, and sixth selective coupler 572 in an engaged configuration and second selective coupler 564, third selective coupler 566, and fifth selective coupler 570 in a disengaged configuration. Therefore, when transitioning between the first forward ratio and the second forward ratio, fifth selective coupler 570 is placed in the disengaged configuration and fourth selective coupler 568 is placed in the engaged configuration.

A third or subsequent forward ratio (shown as 3rd) in truth table 600 of FIG. 6 is achieved by having first selective coupler 562, fourth selective coupler 568, and fifth selective coupler 570 in an engaged configuration and second selective coupler 564, third selective coupler 566, and sixth selective coupler 572 in a disengaged configuration. Therefore, when transitioning between the second forward ratio and the third forward ratio, sixth selective coupler 572 is placed in the disengaged configuration and fifth selective coupler 570 is placed in the engaged configuration.

A fourth or subsequent forward ratio (shown as 4th) in truth table 600 of FIG. 6 is achieved by having first selective coupler 562, third selective coupler 566, and fourth selective coupler 568 in an engaged configuration and second selective coupler 564, fifth selective coupler 570, and sixth selective coupler 572 in a disengaged configuration. Therefore, when transitioning between the third forward ratio and the fourth forward ratio, fifth selective coupler 570 is placed in the disengaged configuration and third selective coupler 566 is placed in the engaged configuration.

A fifth or subsequent forward ratio (shown as 5th) in truth table 600 of FIG. 6 is achieved by having third selective coupler 566, fourth selective coupler 568, and sixth selective coupler 572 in an engaged configuration and first selective coupler 562, second selective coupler 564, and fifth selective coupler 570 in a disengaged configuration. Therefore, when transitioning between the fourth forward ratio and the fifth forward ratio, first selective coupler 562 is placed in the disengaged configuration and sixth selective coupler 572 is placed in the engaged configuration.

A sixth or subsequent forward ratio (shown as 6th) in truth table 600 of FIG. 6 is achieved by having second selective coupler 564, third selective coupler 566, and sixth selective coupler 572 in an engaged configuration and first selective coupler 562, fourth selective coupler 568, and fifth selective coupler 570 in a disengaged configuration. Therefore, when transitioning between the fifth forward ratio and the sixth forward ratio, fourth selective coupler 568 is placed in the disengaged configuration and second selective coupler 564 is placed in the engaged configuration.

A seventh or subsequent forward ratio (shown as 7th) in truth table 600 of FIG. 6 is achieved by having second selective coupler 564, third selective coupler 566, and fifth selective coupler 570 in an engaged configuration and first selective coupler 562, fourth selective coupler 568, and sixth selective coupler 572 in a disengaged configuration. Therefore, when transitioning between the sixth forward ratio and the seventh forward ratio, sixth selective coupler 572 is placed in the disengaged configuration and fifth selective coupler 570 is placed in the engaged configuration.

An eighth or subsequent forward ratio (shown as 8th) in truth table 600 of FIG. 6 is achieved by having second selective coupler 564, third selective coupler 566, and fourth selective coupler 568 in an engaged configuration and first selective coupler 562, fifth selective coupler 570, sixth selective coupler 572 in a disengaged configuration. Therefore, when transitioning between the seventh forward ratio and the eighth forward ratio, fifth selective coupler 570 is placed in the disengaged configuration and fourth selective coupler 568 is placed in the engaged configuration.

A ninth or subsequent forward ratio (shown as 9th) in truth table 600 of FIG. 6 is achieved by having second selective coupler 564, fourth selective coupler 568, and fifth selective coupler 570 in an engaged configuration and first selective coupler 562, third selective coupler 566, and sixth selective coupler 572 in a disengaged configuration. Therefore, when transitioning between the eighth forward ratio and the ninth forward ratio, third selective coupler 566 is placed in the disengaged configuration and fifth selective coupler 570 is placed in the engaged configuration.

A tenth or subsequent forward ratio (shown as 10th) in truth table 600 of FIG. 6 is achieved by having second selective coupler 564, fourth selective coupler 568, and sixth selective coupler 572 in an engaged configuration and first selective coupler 562, third selective coupler 566, and fifth selective coupler 570 in a disengaged configuration. Therefore, when transitioning between the ninth forward ratio and the tenth forward ratio, fifth selective coupler 570 is placed in the disengaged configuration and sixth selective coupler 572 is placed in the engaged configuration.

The present disclosure contemplates that downshifts follow the reverse sequence of the corresponding upshift (as described above). Further, several power-on skip-shifts that are single-transition are possible (e.g. from $1^{st}$ up to $3^{rd}$, from $3^{rd}$ down to $1^{st}$, from $6^{th}$ up to $8^{th}$, and from $8^{th}$ down to $6^{th}$).

In the illustrated embodiments, various combinations of three of the available selective couplers are engaged for each of the illustrated forward speed ratios and reverse speed ratios. Additional forward speed ratios and reverse speed ratios are possible based on other combinations of engaged selective couplers. Although in the illustrated embodiments, each forward speed ratio and reverse speed ratio has three of the available selective couplers engaged, it is contemplated that less than three and more than three selective couplers may be engaged at the same time.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transmission comprising:
   at least one stationary member;
   an input member rotatable relative to the at least one stationary member;
   a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, and a fourth planetary gearset;
   an output member operatively coupled to the input member through the plurality of planetary gearsets and rotatable relative to the at least one stationary member, the output member is fixedly coupled to the third gearset component of the fourth planetary gearset and the second gearset component of the third planetary gearset;
   a first interconnector which fixedly couples the third gearset component of the third planetary gearset to the second gearset component of the fourth planetary gearset;
   a second interconnector which fixedly couples the first gearset component of the fourth planetary gearset to the third gearset component of the first planetary gearset;
   a third interconnector which fixedly couples the first gearset component of the third planetary gearset to the first gearset component of the second planetary gearset;
   a fourth interconnector which fixedly couples the second gearset component of the first planetary gearset to the second gearset component of the second planetary gearset; and
   a plurality of selective couplers, wherein the plurality of selective couplers includes:
   a first selective coupler which, when engaged, fixedly couples the first gearset component of the third planetary gearset and the first gearset component of the second planetary gearset to the at least one stationary member;
   a second selective coupler which, when engaged, fixedly couples the third gearset component of the second planetary gearset to the at least one stationary member;
   a third selective coupler which, when engaged, fixedly couples the input member to the second gearset component of the fourth planetary gearset and to the third gearset component of the third planetary gearset;
   a fourth selective coupler which, when engaged, fixedly couples the input member to the second gearset component of the first planetary gearset and to the second gearset component of the second planetary gearset;
   a fifth selective coupler which, when engaged, fixedly couples the input member to the first gearset component of the first planetary gearset; and a sixth selective coupler which, when engaged, fixedly couples the first gearset component of the first planetary gearset to the third gearset component of the second planetary gearset.

2. The transmission of claim 1, wherein each of the first planetary gearset, the second planetary gearset, the third planetary gearset, and the fourth planetary gearset is a simple planetary gearset.

3. The transmission of claim 2, wherein the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

4. The transmission of claim 1, wherein the at least one stationary member includes a housing, the housing having a first end and a second end, wherein the input member is accessible proximate the first end of the housing;

the output member is accessible proximate the second end of the housing;

the first planetary gearset is positioned between the first end of the housing and the second planetary gearset;

the second planetary gearset is positioned between the first planetary gearset and the third planetary gearset;

the third planetary gearset is positioned between the second planetary gearset and the fourth planetary gearset; and the fourth planetary gearset is positioned between the third planetary gearset and the second end of the housing.

5. The transmission of claim 1, wherein the plurality of selective couplers are selectively engaged in a plurality of combinations to establish at least ten forward speed ratios and at least one reverse speed ratio between the input member and the output member, each of the plurality of combinations having at least three of the plurality of selective couplers engaged.

6. The transmission of claim 5, wherein in a first one of the at least ten forward speed ratios, the first selective coupler is engaged.

7. The transmission of claim 6, wherein in the first one of the at least ten forward speed ratios, the first selective coupler, the fifth selective coupler, and the sixth selective coupler are engaged.

8. The transmission of claim 6, wherein in the first one of the at least ten forward speed ratios, the first selective coupler, the fourth selective coupler, and the sixth selective coupler are engaged.

9. The transmission of claim 6, wherein in the first one of the at least ten forward speed ratios, the first selective coupler, the fourth selective coupler, and the fifth selective coupler are engaged.

10. The transmission of claim 6, wherein in the first one of the at least ten forward speed ratios, the first selective coupler, the third selective coupler, and the fourth selective coupler are engaged.

11. The transmission of claim 5, wherein in a first one of the at least ten forward speed ratios, the second selective coupler is engaged.

12. The transmission of claim 11, wherein in the first one of the at least ten forward speed ratios, the second selective coupler, the third selective coupler, and the sixth selective coupler are engaged.

13. The transmission of claim 11, wherein in the first one of the at least ten forward speed ratios, the second selective coupler, the third selective coupler, and the fifth selective coupler are engaged.

14. The transmission of claim 11, wherein in the first one of the at least ten forward speed ratios, the second selective coupler, the third selective coupler, and the fourth selective coupler are engaged.

15. The transmission of claim 11, wherein in the first one of the at least ten forward speed ratios, the second selective coupler, the fourth selective coupler, and the fifth selective coupler are engaged.

16. The transmission of claim 11, wherein in the first one of the at least ten forward speed ratios, the second selective coupler, the fourth selective coupler, and the sixth selective coupler are engaged.

17. The transmission of claim 5, wherein in a first one of the at least ten forward speed ratios, neither the first selective coupler nor the second selective coupler are engaged.

18. The transmission of claim 17, wherein in the first one of the at least ten forward speed ratios, the third selective coupler, the fourth selective coupler, and the sixth selective coupler are engaged, and a ratio of the input member to the output member is one.

19. The transmission of claim 5, wherein in a first one of the at least one reverse speed ratios, the first selective coupler, the second selective coupler, and the fifth selective coupler are engaged.

* * * * *